US009505321B2

(12) United States Patent
Mazar

(10) Patent No.: US 9,505,321 B2
(45) Date of Patent: Nov. 29, 2016

(54) BABY SAFETY SEAT AND A WHEEL FOR USE THEREIN

(71) Applicant: Doona Holdings Ltd., Quarry Bay (HK)

(72) Inventor: Yoav Mazar, Herzeliya (IL)

(73) Assignee: DOONA HOLDINGS LTD., Quarry Bay (HK)

( * ) Notice: Subject to any disclaimer, the term of this patent is extended or adjusted under 35 U.S.C. 154(b) by 0 days.

(21) Appl. No.: 14/487,999

(22) Filed: Sep. 16, 2014

(65) Prior Publication Data
US 2015/0076798 A1 Mar. 19, 2015

(30) Foreign Application Priority Data

Sep. 17, 2013 (IL) .......................................... 228492
Jan. 16, 2014 (IL) .......................................... 230476

(51) Int. Cl.
*B62B 7/06* (2006.01)
*B60N 2/28* (2006.01)
*B62B 7/12* (2006.01)

(52) U.S. Cl.
CPC ........... *B60N 2/2848* (2013.01); *B60N 2/2845* (2013.01); *B60N 2/2851* (2013.01); *B62B 7/12* (2013.01)

(58) Field of Classification Search
CPC .................................................... B60N 2/2848
USPC ........................................ 280/648; 301/5.309
See application file for complete search history.

(56) References Cited

U.S. PATENT DOCUMENTS 1,693,633 A * 12/1928 Allen .................... B60N 2/2848
280/31
4,632,409 A * 12/1986 Hall ...................... B60N 2/2848
280/30
4,647,054 A * 3/1987 Chong .................. B60N 2/2848
280/30
4,679,804 A * 7/1987 Johnson ..................... B62B 7/12
280/30

(Continued)

FOREIGN PATENT DOCUMENTS

DE 20007466 7/2000
DE 10008230 9/2001

(Continued)

OTHER PUBLICATIONS

European Search Report from European Application No. EP14184906 dated Jan. 22, 2015.

(Continued)

*Primary Examiner* — Jeffrey J Restifo
(74) *Attorney, Agent, or Firm* — Dorsey & Whitney LLP

(57) ABSTRACT

A baby safety car seat convertible into a rollable baby seat includes right and left pairs of front and rear legs, a locking arrangement, and wheels. The seat has an intermediate mode in which a first leg of each pair is in its operational position while a second leg of that pair is in a different intermediate position. The locking arrangement locks the first leg in its operational position to the seat's support portion while allowing movement of the second leg between intermediate and operational positions. Alternatively/additionally, when a first leg is in its operational position, a second leg is movable between its intermediate and operational position, and the locking arrangement locks the front and rear legs of each pair to each other during movement between storage and intermediate states, and unlocks the legs from each other to allow movement of the second leg between intermediate and operational positions.

8 Claims, 17 Drawing Sheets

(56) References Cited

U.S. PATENT DOCUMENTS

| | | | | |
|---|---|---|---|---|
| 4,685,688 | A * | 8/1987 | Edwards | B60N 2/2839 280/30 |
| 4,762,331 | A | 8/1988 | Tucker et al. | |
| 4,763,911 | A | 8/1988 | Gebhard et al. | |
| 4,786,064 | A | 11/1988 | Baghdasarian | |
| 4,822,064 | A * | 4/1989 | Hunter | B60N 2/2821 280/30 |
| 4,828,281 | A * | 5/1989 | Sanchas | B60N 2/2848 280/250 |
| 4,832,354 | A | 5/1989 | LaFreniere | |
| 4,834,403 | A * | 5/1989 | Yanus | B60N 2/2848 188/20 |
| 4,872,692 | A * | 10/1989 | Steenburg | B62B 7/12 280/30 |
| 4,872,693 | A * | 10/1989 | Kennel | B60N 2/2845 280/30 |
| 4,874,182 | A * | 10/1989 | Clark | B62B 7/12 280/30 |
| 4,902,026 | A * | 2/1990 | Maldonado | B60N 2/286 280/30 |
| D310,054 | S | 8/1990 | Tucker et al. | |
| 4,946,180 | A * | 8/1990 | Baer | A47D 1/008 280/39 |
| 4,989,888 | A * | 2/1991 | Qureshi | B60N 2/2848 280/30 |
| 5,022,669 | A | 6/1991 | Johnson | |
| 5,104,134 | A * | 4/1992 | Cone | B60N 2/2848 280/30 |
| 5,133,567 | A * | 7/1992 | Owens | B62B 7/12 16/445 |
| 5,188,380 | A | 2/1993 | Tucek | |
| 5,318,311 | A * | 6/1994 | Bofill | B60N 2/2848 280/30 |
| 5,360,221 | A * | 11/1994 | Chai | B60N 2/2839 280/30 |
| 5,398,951 | A * | 3/1995 | Ryu | B60N 2/2848 280/30 |
| 5,403,022 | A * | 4/1995 | Snider | B60N 2/2848 280/30 |
| D358,058 | S | 5/1995 | Anthony et al. | |
| 5,823,547 | A * | 10/1998 | Otobe | B60N 2/2839 280/30 |
| 6,237,995 | B1 * | 5/2001 | Dierickx | B60N 2/2848 280/648 |
| 6,296,259 | B1 | 10/2001 | Anderson | |
| 6,367,821 | B2 | 4/2002 | Thiele | |
| 6,446,990 | B1 | 9/2002 | Nania et al. | |
| D482,641 | S | 11/2003 | Hansen | |
| 6,655,702 | B2 | 12/2003 | Senger | |
| 6,729,630 | B2 | 5/2004 | Szmidt et al. | |
| 6,910,696 | B2 * | 6/2005 | Bargery | B60N 2/2848 280/30 |
| 6,976,685 | B1 | 12/2005 | King et al. | |
| 6,986,518 | B1 | 1/2006 | Besaw | |
| 7,311,353 | B1 * | 12/2007 | Johnson | A47D 13/02 280/30 |
| 7,506,921 | B1 * | 3/2009 | Sigmon, Jr. | B60N 2/2848 280/30 |
| 7,540,507 | B1 * | 6/2009 | Kennedy | B60N 2/2821 280/30 |
| 7,543,886 | B2 | 6/2009 | Gutierrez-Hedges et al. | |
| 7,600,766 | B2 | 10/2009 | Erskine | |
| 7,871,071 | B2 | 1/2011 | Gnagi et al. | |
| 7,871,099 | B2 * | 1/2011 | Gilbertson | B62B 7/06 280/43.16 |
| 8,128,118 | B2 * | 3/2012 | Friisdahl | B62B 7/12 280/47.38 |
| 8,434,781 | B2 * | 5/2013 | Mazar | B60N 2/2845 280/30 |
| 8,469,389 | B2 | 6/2013 | Mazar et al. | |
| 8,469,390 | B2 | 6/2013 | Mazar et al. | |
| 8,801,028 | B2 | 8/2014 | Mazar et al. | |
| 8,998,242 | B2 * | 4/2015 | Wang | B62B 7/06 280/30 |
| 2002/0060444 | A1 * | 5/2002 | Cote | B60N 2/2806 280/648 |
| 2003/0015894 | A1 * | 1/2003 | Bargery | B60N 2/2848 297/118 |
| 2003/0201625 | A1 * | 10/2003 | Espenshade | B62B 7/10 280/642 |
| 2003/0201626 | A1 * | 10/2003 | Hartenstine | B62B 7/083 280/642 |
| 2007/0085302 | A1 * | 4/2007 | You | B62B 7/06 280/642 |
| 2008/0079293 | A1 | 4/2008 | Hedges et al. | |
| 2012/0032420 | A1 * | 2/2012 | Mazar | B60N 2/2845 280/648 |
| 2012/0119457 | A1 * | 5/2012 | Williams | B60N 2/2821 280/30 |
| 2012/0267876 | A1 | 10/2012 | Mazar et al. | |
| 2012/0267877 | A1 | 10/2012 | Mazar et al. | |
| 2013/0229033 | A1 * | 9/2013 | Lee | B60N 2/2887 297/130 |
| 2014/0097598 | A1 * | 4/2014 | Sundberg | B62B 7/12 280/650 |
| 2014/0265255 | A1 * | 9/2014 | Wang | B62B 7/06 280/643 |
| 2015/0076798 | A1 * | 3/2015 | Mazar | B60N 2/2848 280/648 |

FOREIGN PATENT DOCUMENTS

| | | |
|---|---|---|
| DE | 102007023509 | 11/2008 |
| DE | 102007037588 | 2/2009 |
| DE | 102007044833 | 4/2009 |
| EP | 0466429 | 1/1992 |
| EP | 0639490 | 2/1995 |
| EP | 0650881 | 5/1995 |
| FR | 2745765 | 9/1997 |
| GB | 2231537 | 11/1990 |
| GB | 2377677 | 1/2003 |
| GB | 2409970 | 7/2005 |
| GB | 2499422 | 8/2013 |
| JP | 61027953 | 8/1986 |
| JP | H072117 | 1/1995 |
| JP | H07117677 | 5/1995 |
| JP | H07117678 | 5/1995 |
| WO | WO 01/79022 | 10/2001 |
| WO | 03/008228 | 1/2003 |
| WO | 2008/141778 | 11/2008 |
| WO | 2010/119446 | 10/2010 |

OTHER PUBLICATIONS

U.S. Appl. No. 61/212,773, filed Apr. 16, 2009, Mazar et al.
U.S. Appl. No. 13/263,884, filed Oct. 11, 2011, Mazar et al.
U.S. Appl. No. 13/542,255, filed Jul. 5, 2012, Mazar et al.
U.S. Appl. No. 13/542,260, filed Jul. 5, 2012, Mazar et al.
U.S. Appl. No. 13/542,266, filed Jul. 5, 2012, Mazar et al.
Gogo Kidz Travel Mate, Convert your car seat into a stroller, toddler's travels, http://www.toddlerstravels.com/product-pages/gogo-kidz-travelmate.php, accessed Oct. 4, 2012.
International Search Report and Written Opinion from International Application No. PCT/IL2010/000307 dated May 26, 2011.
The All in One Child Travel Seat, http://www.hammacher.com/Product/Default.aspx?sku=77956&refsku=67232, accessed Oct. 3, 2012.
European Search Report from European Application No. EP12171580 dated Feb. 27, 2013.
European Search Report from European Application No. EP12171594 dated Feb. 27, 2013.
European Search Report from European Application No. EP12171606 dated Feb. 27, 2013.

* cited by examiner

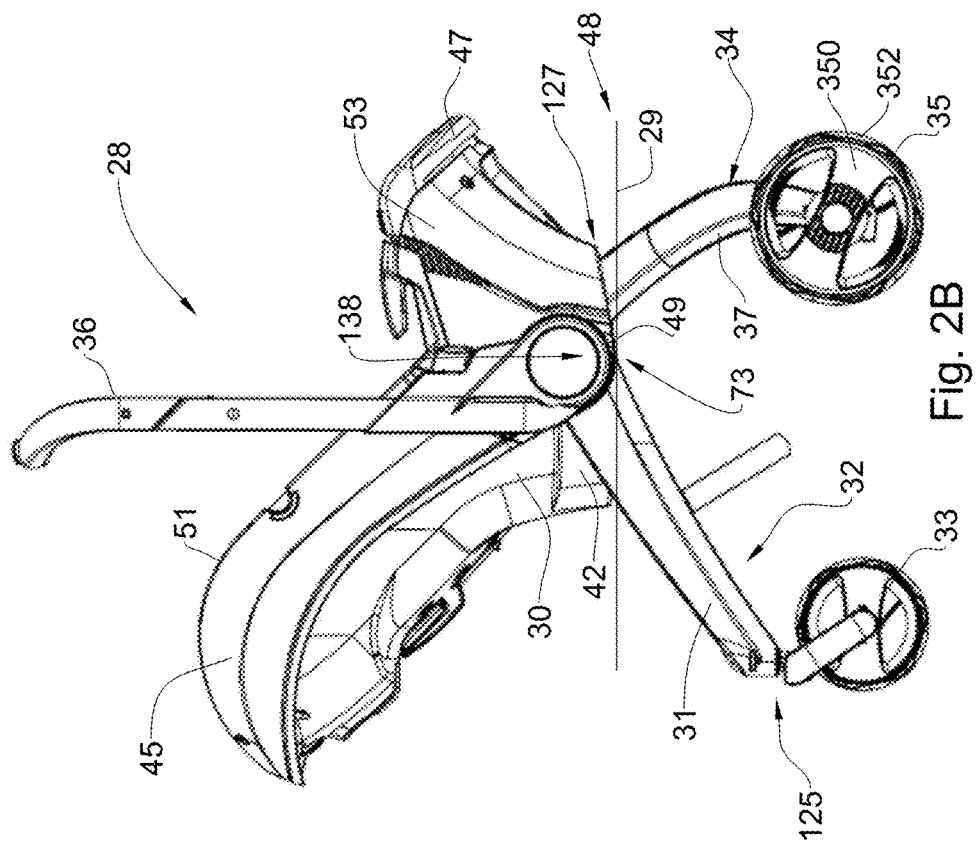
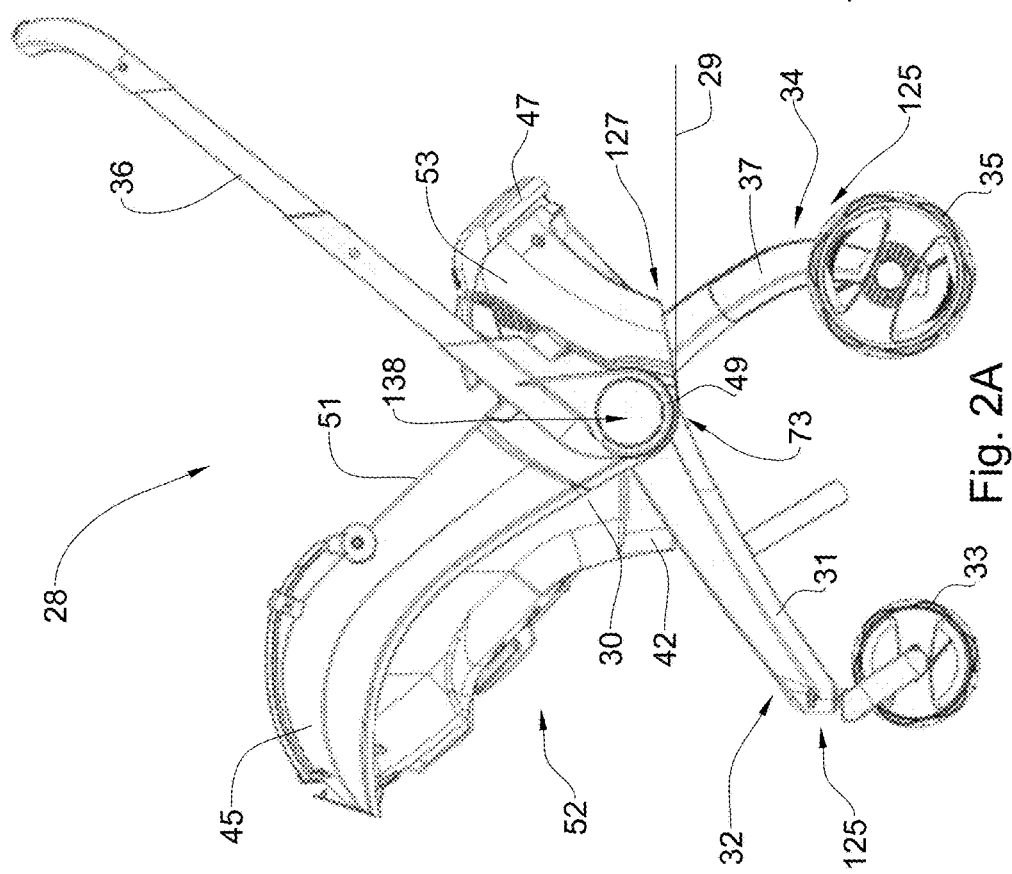

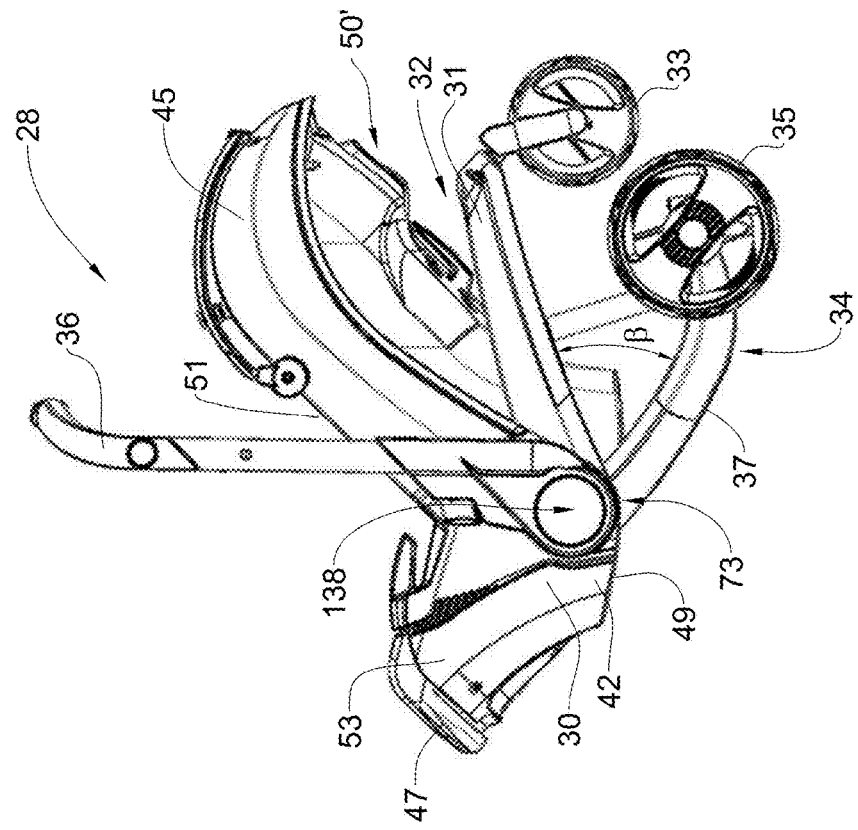
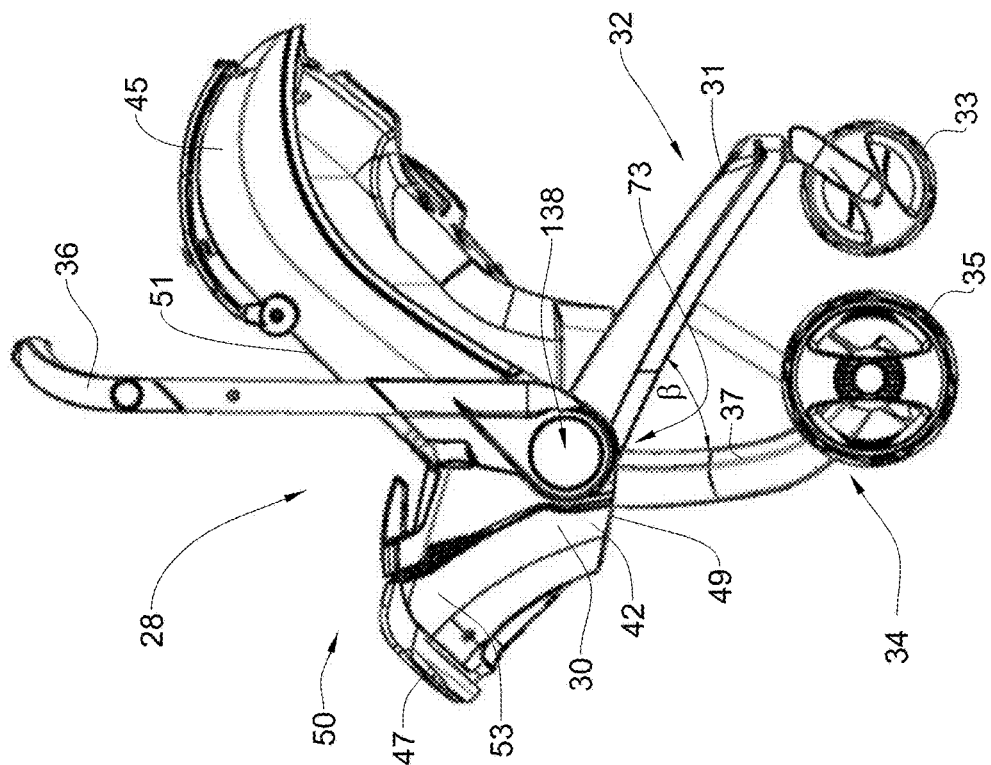
Fig. 3B
Fig. 3A

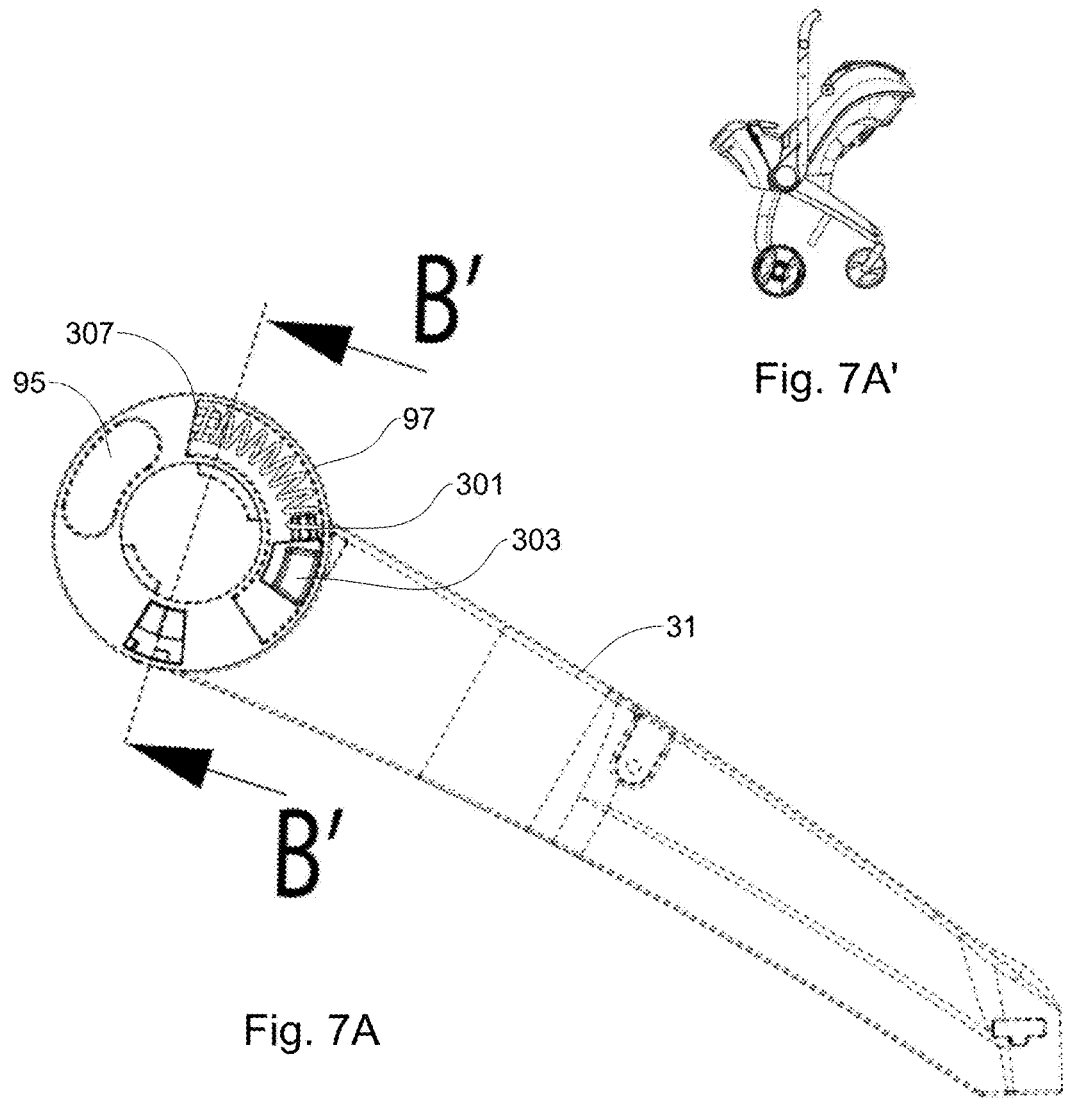
Fig. 7A'
Fig. 7A
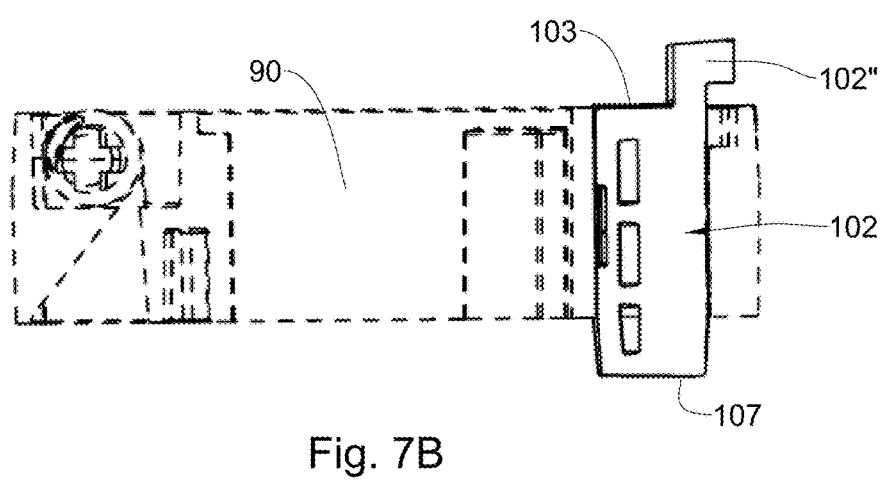
Fig. 7B

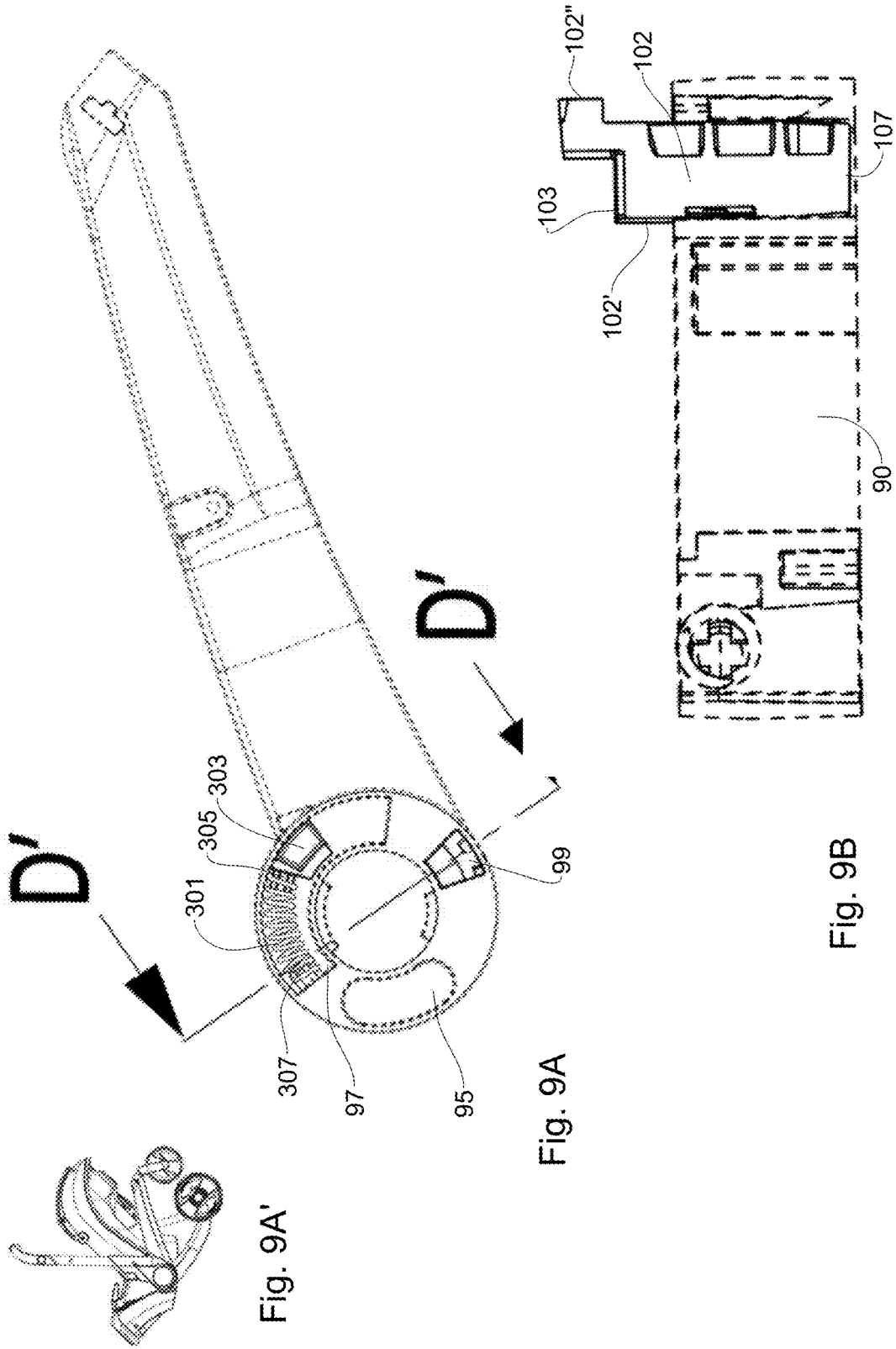

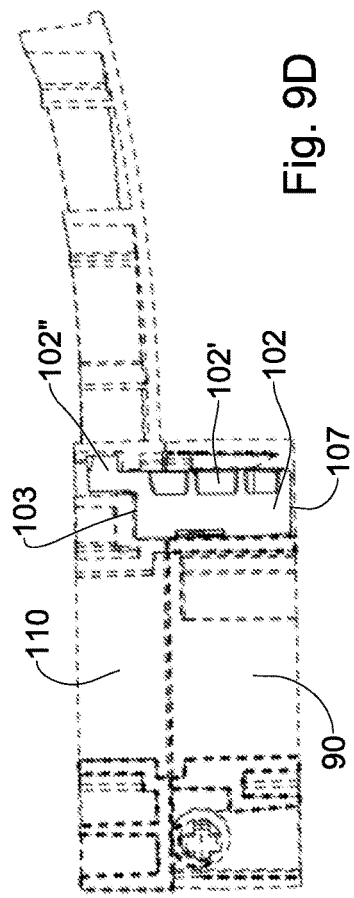
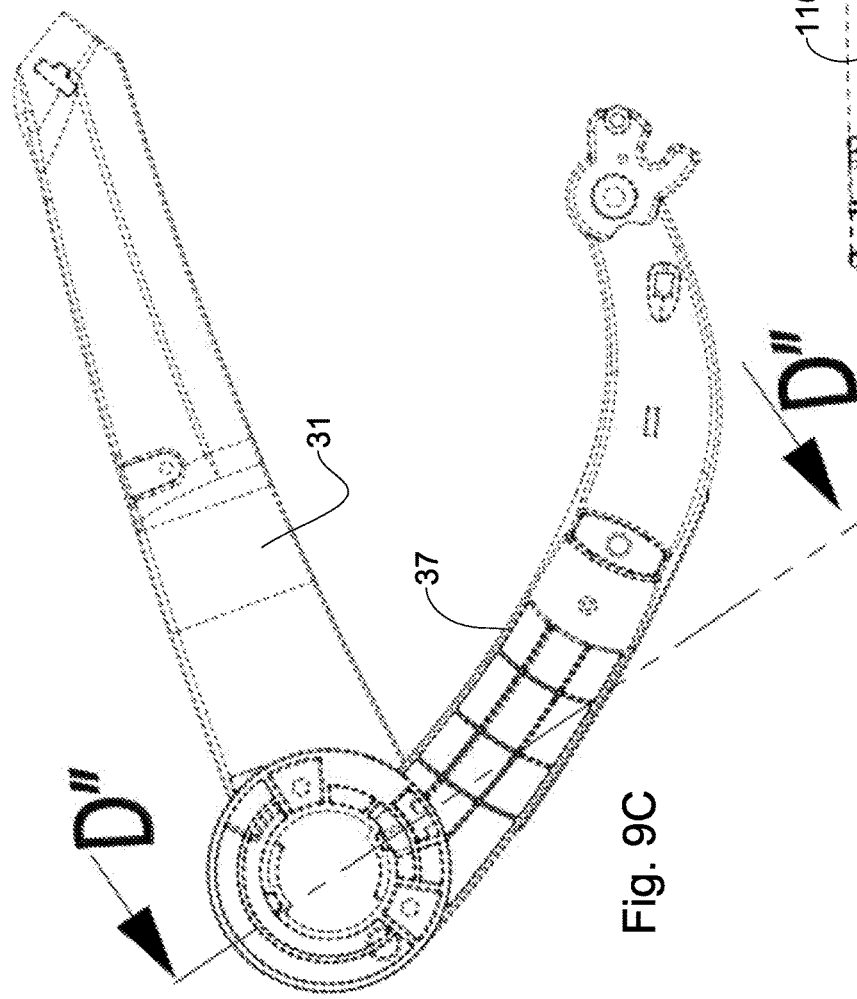
Fig. 9D
Fig. 9C

BABY SAFETY SEAT AND A WHEEL FOR USE THEREIN

CROSS-REFERENCE TO RELATED APPLICATIONS

This application claims priority to Israeli Patent Application No. 228492 filed on 17 Sep. 2013 and Israeli Patent Application No. 230476 filed on 16 Jan. 2014. The contents of each of the foregoing applications are incorporated herein, in their entirety, by this reference.

TECHNICAL FIELD

Embodiments of the invention relate to a baby car seat, which can be used as a baby carrier and can be converted to become rollable for use, for example, as a baby carriage.

BACKGROUND

WO 01/79022 discloses a convertible baby car seat of the kind, to which the subject matter of the present application refers.

SUMMARY

In accordance with one aspect of the subject matter of the present application, there is provided a baby safety car seat having, at least when in use, a state in which the baby safety car seat is convertible into a rollable baby seat, the baby safety car seat, at least in the state, comprising:

a lower, support portion including a seat lowermost area configured to contact an external surface to which the seat is to be mounted, and defining an imaginary horizontal base plane, and two, right and left, leg attachment areas on respective right and left sides of the lowermost area;

an upper, seating portion having a front, head area and a rear, feet area, the head area being spaced from the imaginary horizontal base plane to a distance greater than the feet area;

a right and a left pair of front and rear legs, the legs of each pair having distal ends associated with wheels and proximal ends articulated to the seat lower portion at the corresponding leg attachment area, each leg being rotatable between a storage position to be taken in a safety car seat mode of the seat, in which the distal end of the leg is disposed above the imaginary horizontal base plane, and an operational position to be taken in a rolling-carrier mode of the seat, in which the distal end of the leg is disposed below the plane; the seat having an intermediate mode in which a first one of the legs of each pair is in its operational position whilst the second leg of that pair is its intermediate position in which the distal end of that leg is disposed below said plane but which is other than the operational position of this leg; and a locking arrangement configured for locking the first leg in its operational position to the support portion whilst allowing the movement of said second leg between its intermediate and operational positions.

The locking arrangement can be further configured for locking the legs of each pair to each other during their movement between their storage position and the operational position of said first leg combined with the intermediate position of the second leg.

The second leg of each pair can be rotatable from its storage position to its intermediate position, and/or the first leg of each pair is rotatable from its storage position to its operational position, at least partially under the influence of gravity.

The second leg of each pair of legs can be rotatable from its intermediate position to its operational position by means of an actuating mechanism operable only when the first leg of said pair is in its operational position.

At least one of the rear and front legs and, optionally, both legs of each pair, when in the storage position, can have their distal ends disposed under the head area of the upper seating portion, with the distal end of the first leg of each pair being disposed between said head area and the distal end of the second leg of that pair, when seen in the side view of the seat.

The leg attachment areas can have a common substantially horizontal axis disposed above the plane, the legs being rotatable about the axis at locations spaced from each other therealong.

The head area of the seating portion can be disposed further from the axis than the feet area thereof.

The baby safety seat can further comprise a handle having a handle distal end at which the seat is to be carried by a user, and handle proximal end at which the handle is attached to the lower portion of the seat so as to be rotatable about a substantially horizontal handle rotation axis, between a storage position in which the handle distal end is disposed adjacent to the head area of the upper portion of the seat and at least a carrying position, in which the handle has an orientation transverse to the substantially horizontal rotation axis and is disposed between the head and the feet areas of the upper portion of the seat.

The carrying position of the handle can be combinable with the operational position of the first leg and the intermediate position of the second leg of each pair of legs, as well as with the operational position of both legs of that pair.

The handle can be rotatable from the storage or carrying position to an anti-rebound position or to a pushable position, in which the distal end of the handle is disposed closer to the feet area than to the head area and at a distance from the head area of the seat that is at least not shorter than a distance between the head and the feet areas, to bring the seat into a pushable-carriage mode.

Regarding the anti-rebound position of the handle, this adds to the safety car seat the ability of being stabilized during and after possible front and rear collisions of the car, in which the seat is mounted with a baby facing a car surface, e.g. a seatback, by minimizing rotational forces associated with such collisions, thereby preventing the baby from hitting that surface with his/her head.

The handle can be extendible in the pushable-carriage mode to increase the distance from the distal end to the base plane.

In accordance with another aspect of the presently disclosed subject matter, there is provided a baby safety car seat having, at least when in use, a state in which the baby safety car seat is convertible into a rollable baby seat, the baby safety car seat, at least in the state, comprising:

a lower, support portion including a seat lowermost area configured to contact an external surface to which the seat is to be mounted, and defining an imaginary horizontal base plane, and two leg attachment areas on two sides of the lowermost area;

an upper, seating portion having a front, head area and a rear, feet area, the head area being spaced from the imaginary horizontal base plane to a distance greater than the feet area;

a right pair of front and rear legs and a left pair of front and rear legs, the legs of each pair having distal ends associated with wheels and proximal ends articulated to the seat lower portion at the corresponding right or left leg attachment area, each legs being rotatable between a storage position to be taken in a safety car seat mode of the seat, in which the distal end of the leg is disposed above the imaginary horizontal base plane, and an operational position to be taken in a rolling-carrier mode of the seat, in which the distal end of each leg is disposed below the plane, each pair of legs having a common storage state in which both legs are in their storage position, a common operational state in which both legs are in their operational position, and an intermediate state in which a first of the legs is in its operational position whilst the second leg is movable between its intermediate and operational position; and a locking mechanism configured for locking the front and rear legs of each pair to each other during their movement between their storage and intermediate states, and unlocking the legs from each other to allow the movement of said second leg between its intermediate and operational positions.

According to a further aspect of the subject matter of the present application, there is provided a baby safety car seat having, at least when in use, a state in which the baby safety car seat is convertible into a rollable baby seat, the baby safety car seat, at least in the state, comprising:

a lower, support portion including a seat lowermost area;

an upper, seating portion having a front, head area and a rear, feet area;

a right and a left pair of front and rear legs, the legs of each pair having proximal ends articulated to the seat lower portion so as to be rotatable between a storage position to be taken in a safety car seat mode of the seat, and an operational position to be taken in a rolling-carrier mode of the seat, the legs;

wheels associated with distal ends of the legs, each wheel comprising a wheel body formed with at least one cut-out, the cut-out having a front edge and a cut-out surface extending rearwardly therefrom, the cut-out surface having a radially distal surface portion oriented so that a radially distal portion of the front edge of the cut-out is disposed further from a central axis of the wheel, about which it is to be rotated, than any other area of the radially distal surface portion seen a front view of the wheel.

According to a still further aspect of the subject matter of the present application, there is provided a baby safety car seat having, at least when in use, a state in which the baby safety car seat is convertible into a rollable baby seat, the baby safety car seat, at least in the state, comprising:

a lower, support portion including a seat lowermost area;

an upper, seating portion having a front, head area and a rear, feet area;

a right and a left pair of front and rear legs, the legs of each pair having proximal ends articulated to the seat lower portion so as to be rotatable between a storage position to be taken in a safety car seat mode of the seat, and an operational position to be taken in a rolling-carrier mode of the seat, the legs;

wheels associated with distal ends of the legs, each wheel comprising a wheel body with a tire mounted thereon, the wheel body of at least one wheel being formed with a surface accessible to a user for applying thereto by his foot of a downward force, said surface having at least one of the following features:

said surface has a non-slip property better than that of at least one other portion of the wheel body, which is optionally achieved by a non-slip texture of said surface;

said surface has a first color different from a second color, which the wheel body has at least at an area of the wheel body surrounding or adjacent the cut-out, wherein said first color optionally contrasts with said second color so that the cut-out is readily distinguishable on the background of the remainder of the wheel of the seat; or said surface is made of a first material other than a second material, from which at least one other portion of the wheel body is made.

According to a further aspect of the presently disclosed subject matter, there is provided a wheel for a baby safety car seat, comprising a wheel body formed with at least one cut-out, the cut-out having a front edge and a cut-out surface extending rearwardly therefrom, the cut-out surface having a radially distal surface portion oriented so that a radially distal portion of the front edge of the cut-out is disposed further from a central axis of the wheel, about which it is to be rotated, than any other area of the radially distal surface portion seen a front view of the wheel.

According to a still further aspect of the presently disclosed subject matter, there is provided a wheel for a baby safety car seat, comprising a wheel body formed with at least one cut-out having a front edge, a rear edge and a cut-out surface extending therebetween, the front edge of the cut-out having a length l of not less than 4 mm, along which its height H is not less than 3 cm, more particularly, not less than 4 cm, and still more particularly, not less than 5 cm.

According to still further aspect of the presently disclosed subject matter, there is provided a wheel for a baby safety car seat comprising a wheel body with a tire mounted thereon, the wheel body being formed with a surface accessible to a user for applying thereto by his foot of a downward force, said surface having at least one of the following features:

said surface has a non-slip property better than that of at least one other portion of the wheel body, which is optionally achieved by a non-slip texture of said surface;

said surface has a first color different from a second color, which the wheel body has at least at an area of the wheel body surrounding or adjacent the cut-out, wherein said first color optionally contrasts with said second color so that the cut-out is readily distinguishable on the background of the remainder of the wheel of the seat; or said surface is made of a first material other than a second material, from which at least one other portion of the wheel body is made.

A baby safety car seat according to any of the above aspects of the subject matter of the present application can have features of other different aspects described above, or their equivalents, in any combination thereof, which can also be combined with any feature/s of the seat described in Detailed Description of Embodiments presented below, or their equivalents.

In addition, the baby safety seat according to the subject matter of the present application can have permanent and attachable components, the former allowing the use of the seat in a conventional manner and the latter being attachable thereto to bring the seat into a state allowing its conversion into a rollable baby seat.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 1A to 4 are views of a baby safety car seat assembly according to the subject matter of the present application, in several modes thereof;

FIG. 7A is a cross-sectional view of the front leg, when the safety car seat is in a position shown in FIG. 7A';

FIG. 7B is a cross-sectional view of a disk-like portion of the front leg, taken along line A'-A' in FIG. 7A, when the safety car seat is in a position shown in FIG. 7A';

FIG. 9A is a cross-sectional view of the front leg, when the safety car seat is in a position shown in FIG. 9A';

FIG. 9B is a cross-sectional view of a disk-like portion of the front leg, taken along line D'-D' in FIG. 9A, when the safety car seat is in a position shown in FIG. 9A';

FIG. 9C is a cross-sectional view of the front and rear legs, when the safety car seat is in a position shown in FIG. 9A'; and FIG. 9D is a cross-sectional view of the disk-like portions of the front and rear legs, taken along line D"-D" in FIG. 9C, when the safety car seat is in a position shown in FIG. 9A'.

DETAILED DESCRIPTION OF EMBODIMENTS

Figure 1A:
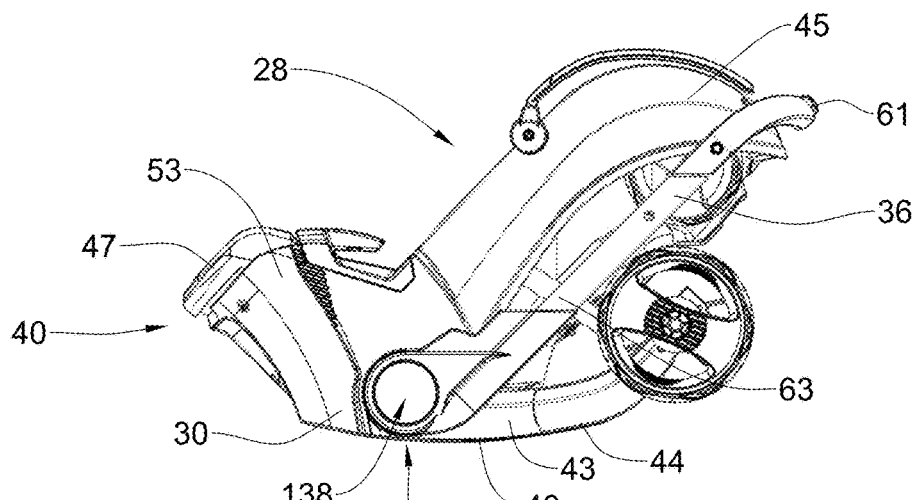

FIGS. 1A to 4 illustrate a convertable baby safety car seat assembly 28, according to an embodiment of the present invention, in different modes of its operation. These modes of operation are a storage mode 40 shown in FIG. 1A, a normal carrying mode 46 shown in FIG. 1B, an anti-rebound mode 41 shown in FIG. 1C, a long-handle pushable-carriage mode 52 shown in FIG. 2A, a rolling-carrier mode 48 shown in FIG. 2B, a short-handle pushable-carriage mode 60 (FIG. 4), which constitutes in operational intermediate mode between the modes 48 and 52, and a non-operational intermediate mode 50 (FIG. 3A) via which the seat is converted from its mode 46 into its mode 48, through a number of transitional states (of which one is shown as 50' in FIG. 3B).

In the following description, the convertable seat assembly 28 will also be referred to as a combination-seat or a seat and carriage combination.

The combination-seat 28 is very similar in most of its construction to a seat disclosed in US 2012/0032420 to the Applicant, with the main difference between them being in the mechanism illustrated in FIGS. 8A to 12D of US 2012/0032420. In view of this, a number of components of the seat 28 are not described herein in detail but rather reference is made to the corresponding description and drawings of US 2012/0032420.

Thus, the combination-seat 28 has a general construction of its seat 30 very similar to that described in US 2012/0032420, whose corresponding detailed description and drawings are incorporated herein by reference. Briefly speaking, the seat 28 includes an upper seating section 51, a lower, base section 42 fixedly coupled to the upper seating section 51, including a seat lowermost area 49, a front head area 45 and a rear feet area 47 of the upper seating section 51. The seat lowermost area 49 defines an imaginary horizontal base plane 29 (FIGS. 2A and 2B), from which the head area 45 is spaced to a greater distance than the feet area 47.

Similarly to the seat disclosed in US 2012/0032420, the combination-seat 28 further comprises two, left and right, leg attachment areas 73 (best seen in FIG. 4B of US 2012/0032420) on two sides of the lowermost area located above the base plane and extending along a horizontal axis X (FIG. 3B of US 2012/0032420) of the assembly. More detailed description of the leg attachment areas is provided in US 2012/0032420, which is incorporated herein by reference.

The base section 42 has lower edges 44 (FIGS. 1A and 1B) which are advantageously formed as a curve.

The combination-seat 28 further comprises two front legs-and-wheels assemblies 32 and two rear legs-and-wheels assemblies 34 (which can hereinafter be also referred to as 'legs', FIGS. 2A to 4). Each front legs-and-wheels assembly 32 comprises front supports legs 31 and front wheels 33. Each rear legs-and-wheels assembly 34 comprises rear supports legs 37 and rear wheels 35.

Each leg support in each of the above assemblies has a distal end 125 associated with a wheel and a proximal end 127 (FIGS. 2A and 2B) articulated to the seat lower portion at the corresponding leg attachment area 73. Each leg attachment area 73 accommodates the proximal ends of one rear and one front leg so that these legs constitute a pair of front and rear legs 32 and 34, in which pair the front and rear legs take different positions relative to each other and to the seat lower portion including a storage position to be taken by each leg in a safety car seat mode of the seat (FIG. 1A), in which the distal ends 125 of the legs are disposed above the base plane 29, an operational position to be taken by each leg of each pair in a rolling-carrier mode of the seat (FIG. 2B), in which the distal ends 125 of the legs are disposed below the plane 29, and to be taken by the front leg 32 of each pair in an intermediate mode of the seat (FIG. 3A), at the time when the rear leg 34 of the same pair moves from its intermediate position to its operational position.

Figure 4:
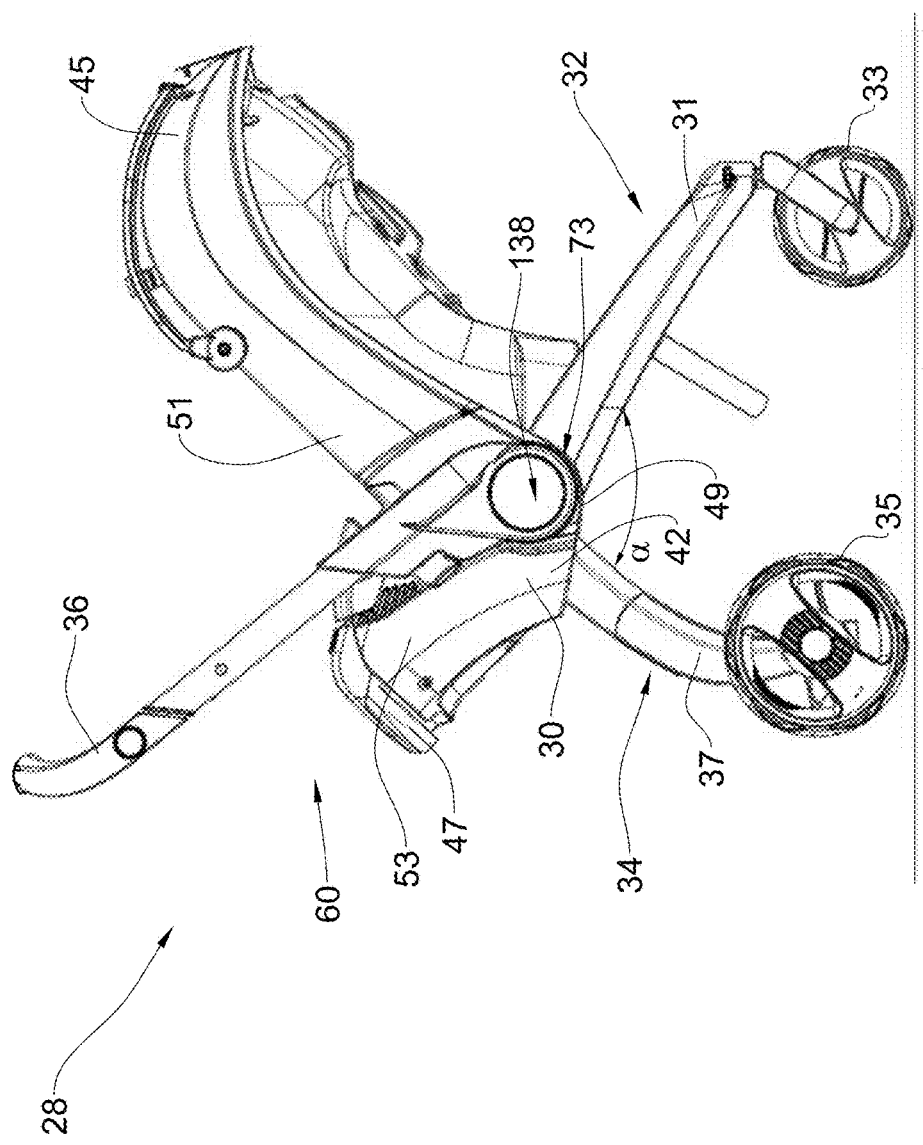

Both legs of each pair, when in the storage position, have their distal ends 125 with their associated wheels disposed under the head area 45 of the upper seating section 51. The combination-seat 28 further contains an extendable handle 36 having a handle distal end 61 (FIGS. 1A and 1B) and handle proximal end 63 and configured to rotate about a horizontal handle rotation axis (coinciding with the axis X) from a storage position in the storage mode of the combination-seat 28 (FIG. 1A) to a carrying position in the carrying, intermediate and rollable-carrier modes of the combination-seat (FIGS. 1B and 2B) and pushable position in the pushable-carriage mode (FIGS. 2A and 4).

With reference to FIGS. 2A and 2B, each rear wheel 35 has a wheel body 350, on which a tire 352 is mounted so as to project from the wheel body. As seen in more detail in FIGS. 5D and 5F, the wheel body 350 has a front face 360, a rear face 370 and two cut-outs 375 extending therebetween and separated by a central body portion 377.

Figure 5A:
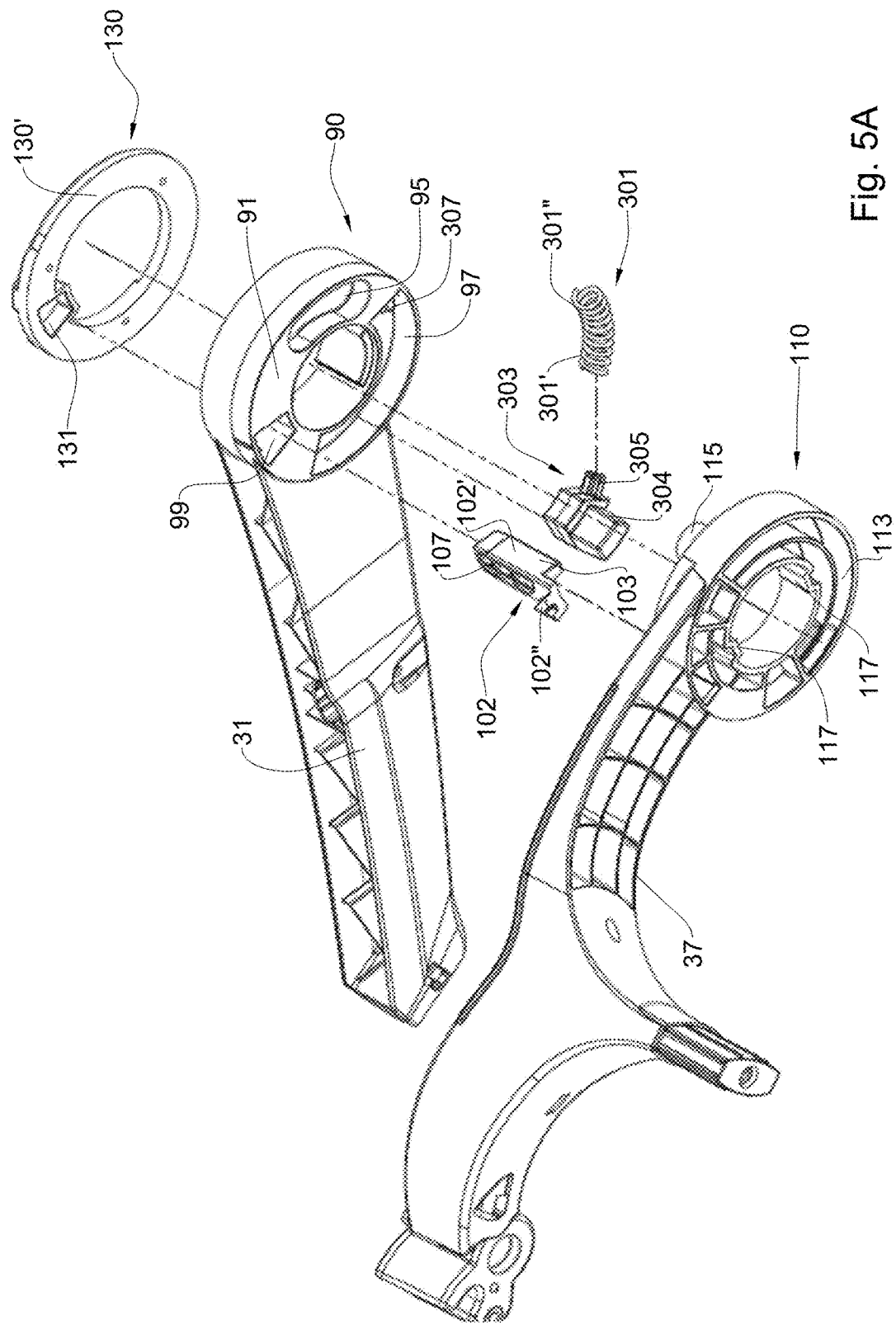
FIG. 5A to 5C are exploded perspective views of an assembly of the front and rear legs of the baby safety car seat of FIGS. 1A to 4.
Figure 5B:
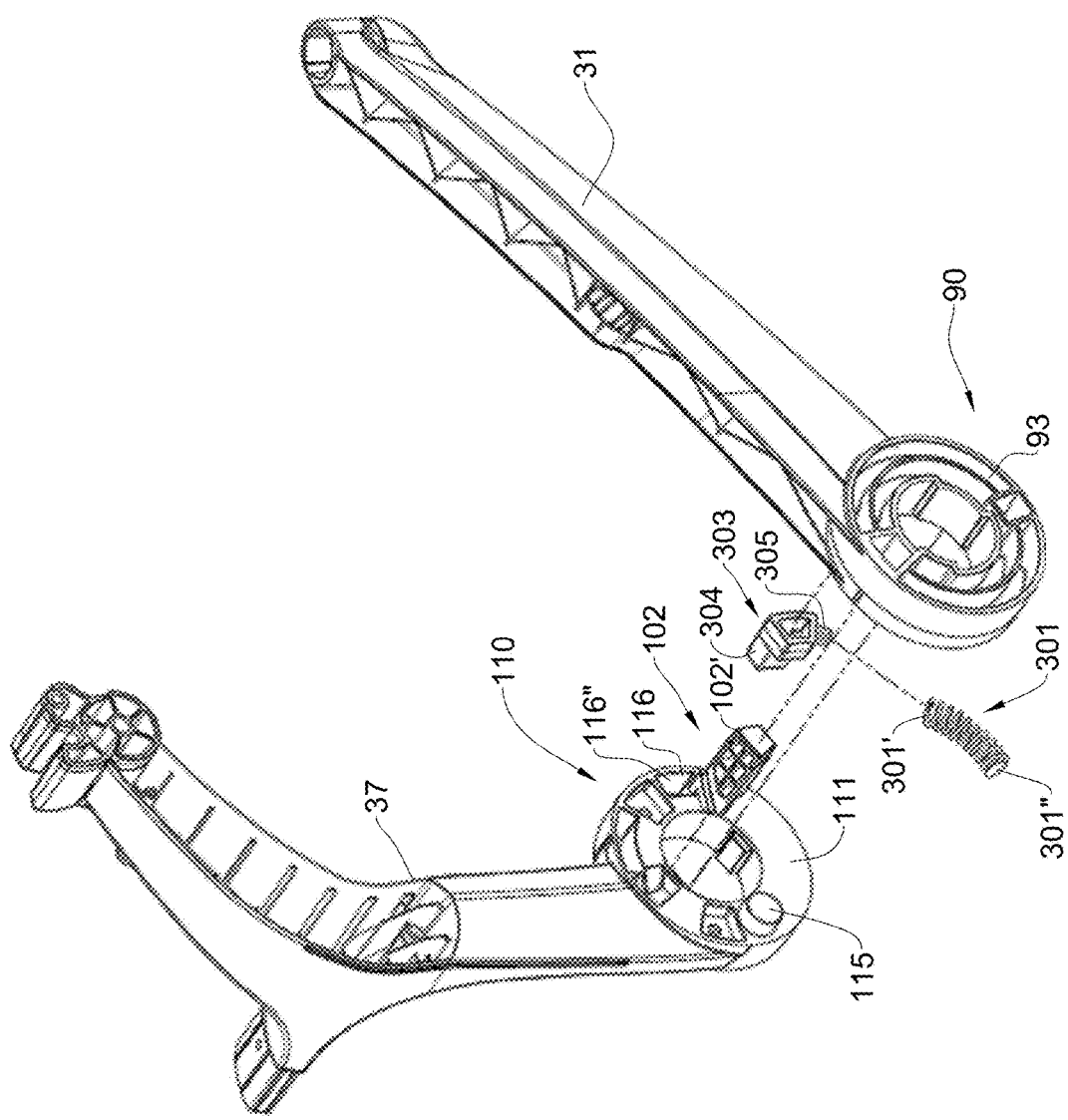
Figure 5C:
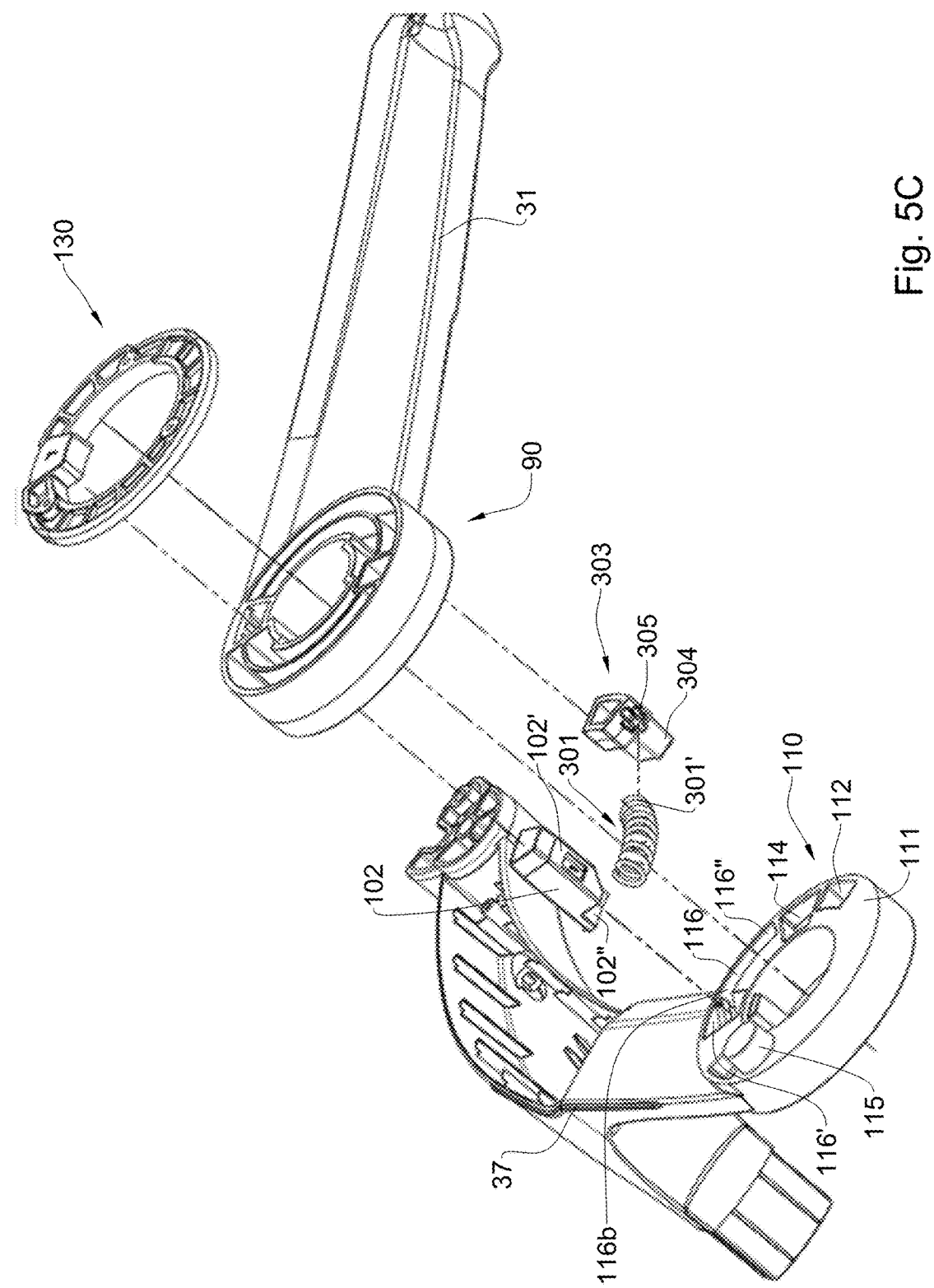
Figure 5D:
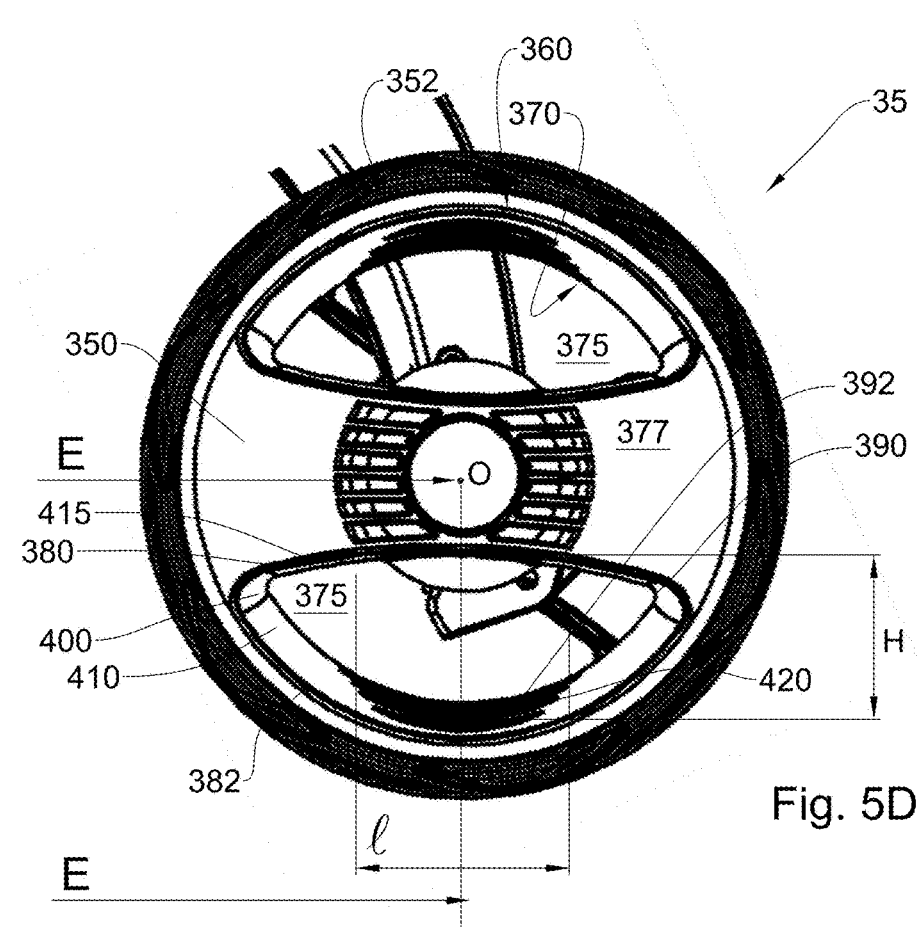
FIG. 5D and FIG. 5E are, respectively, an enlarged front plan view of a wheel of a rear leg of the baby safety car seat of FIGS. 1A to 4, and a corresponding computer generated image of the wheel.
Figure 5E:
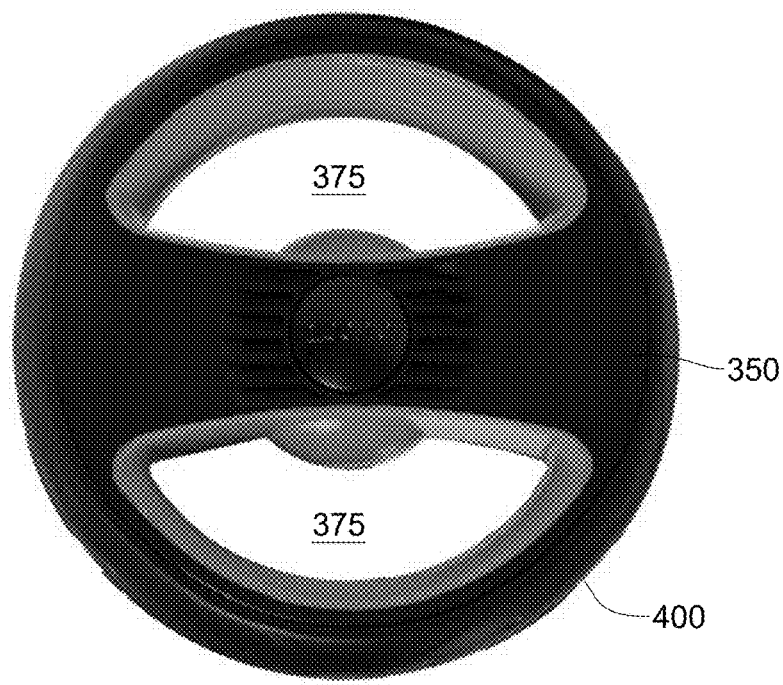

As seen in FIGS. 5D and 5E, each cut-out 375 is free of material of the wheel body and any other solid material, and has an effective length l and height H such as to allow the use of the cut-out for the fixation of the wheel in place, when the corresponding leg is it its operative position and the wheel contacts a floor or ground surface, by a toe part of a shoe or boot of an adult user by pressing downwardly on the cut-out. Such pedal-like use can allow for the fixation of the position of the wheel, when it is desired to prevent its movement, which fixation can be of great help when, for example, bringing the seat legs into their storage position, as described below in more detail. To facilitate the above use of the cut-out, it can have its length l of not less than 4 cm, along which it has height H is not less than 3 cm. In particular, the effective length l can be not less 4 cm, more particularly not less than 5 cm, still more particularly, not less than 7 cm, and for each of these values of the length l, the height H can be not less than 3 mm, and more particularly, not less than 4 cm and still more particularly, not less than 5 cm.

Figure 5F:
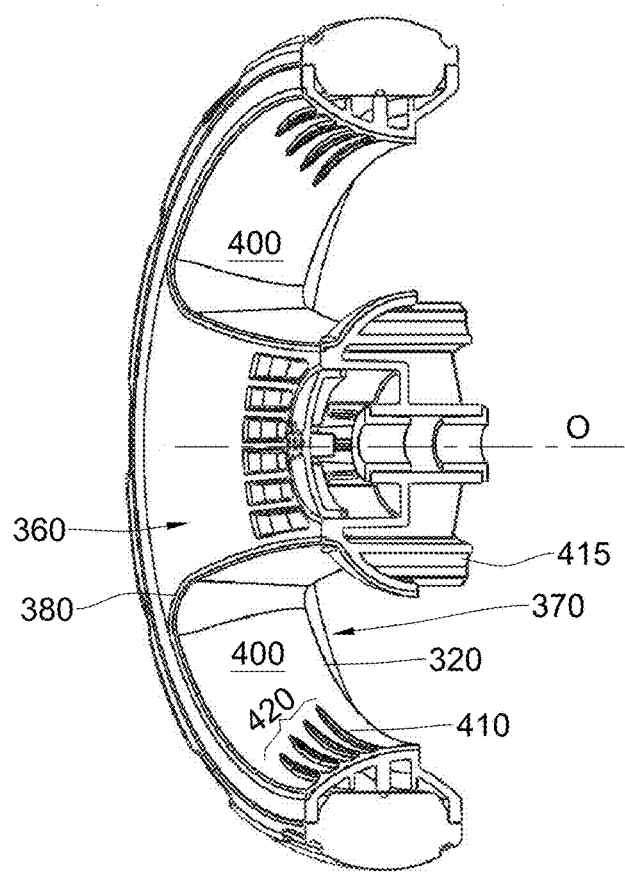
FIG. 5F and FIG. 5G are, respectively, a perspective cross-sectional view of the wheel shown in FIG. 5D taken along line E-E in FIG. 5D, and a corresponding computer-generated image of the wheel.

As seen FIGS. 5D and 5F, each cut-out 375 has a front edge 380 associated with the front face 360 of the wheel body 350, a rear edge 390 associated with the rear face 370 of the wheel body 350, and a cut-out surface 400 extending therebetween. The cut-out surface 400 has a radially distal surface portion 410 and a radially proximal portion 415, the former being spaced further than the latter from a central axis O of the wheel.

In addition, the radially distal surface portion 410 can be oriented so that a radially distal portion 382 of the front edge 380 is disposed further from the axis O of the wheel than radially distal portion 392 of the rear edge 390, as seen in FIG. 5D. This orientation of the radially distant surface portion 410 of the cut-out surface 400, which is also seen in FIGS. 5E and 5G, can facilitate the pedal-like manner of use of the cut-out for the fixation of the wheel, as mentioned above.

The cut-out surface 400 or at least its radially distal surface portion 410 can have a non-slip property better/higher than that of at least one surface area of the wheel body spaced from the cut-out. For example, the radially distal surface portion 410 can have a non-slip texture designated as 420 in FIG. 5D and shown as a plurality of ribs in FIG. 5F, or it can be made of a non-slip material. Furthermore, a part of the wheel body 350 associated with the cut-out including the cut-out surface 400 can be made of a material other than that of the remainder of the wheel body, and such material can have a not-slip property better/higher than that of the material from which the reminder of the wheel body is made.

Figure 5G:
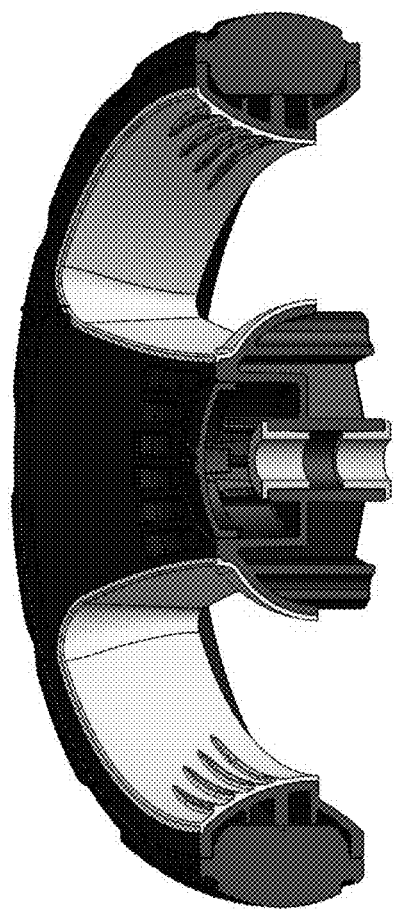

The cut-out surface 400 or at least its radially distal surface portion 410 can have a color, which is different from that of the remainder of the wheel body, as illustrated in FIGS. 5F and 5G. This color can be such as to contrast with the reminder of the wheel body and be readily distinguishable over its background, thereby facilitating the above use of the cut-out at any time of the day. The wheel body 350 can have its entire part associated with the cut-out including the cut-out surface 400 made of a first material having a first color, and at least an area of the reminder of the wheel body surrounding or adjacent to the above part can be made of one or more other materials having other one or more colors.

Figure 1B:
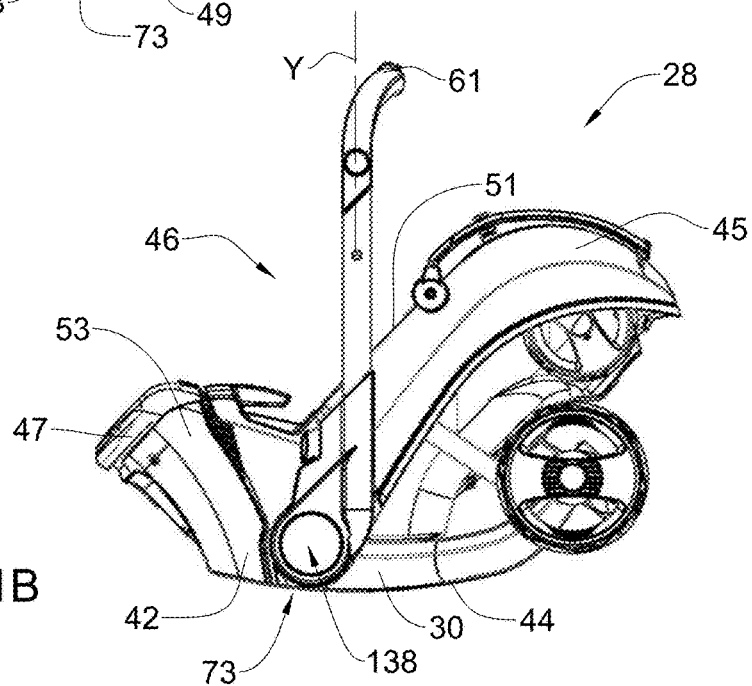
Figure 1C:
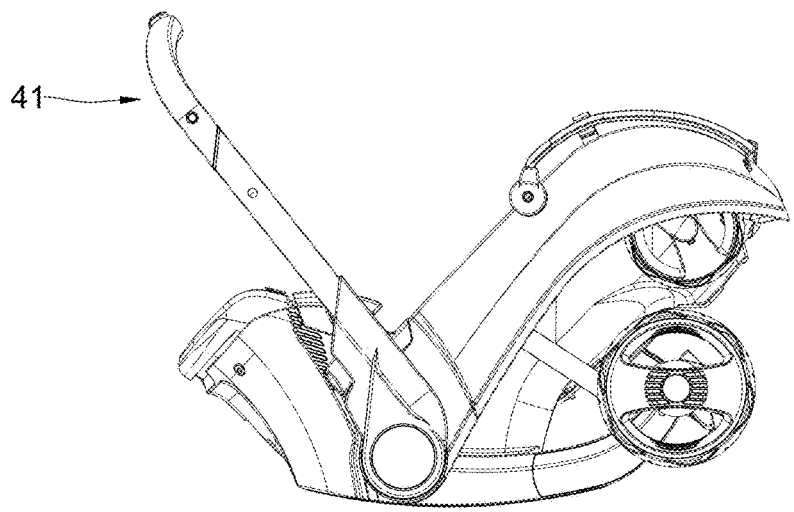

In the described embodiment of the baby safety car seat, the front wheels 33 have shape and proportions similar to those of the rear wheels 35 as described above, but they have a smaller diameter and are narrower than the rear wheels 35, as shown in FIG. 3B of US 2012/0032420, to facilitate their accommodation under the head portion of the seat in a non-protrusive manner, as shown in FIGS. 1A and 1B. In addition, the front wheels are not formed with the non-slip property and different color of any surface of their cut-outs.

Baby seat 30 comprises a left locking assembly 138 and a right locking assembly 138 (the elements of which are discussed in detail below with reference to FIGS. 5A to 9D) spaced from each other along the axis X, each being disposed in the corresponding left or right legs attachment area 73. Each locking assembly 138 comprises a first locking mechanism 179 configured to lock the legs of each pair to the lower portion of the seat when they are both in the storage position (FIG. 1A), and in the operational position (FIGS. 2A and 2B), allowing rotation of the legs when unlocked, between these positions, and a second locking mechanism 202 configured:

to lock the legs of each pair to each other so that they can rotate together until a first one of the legs of each pair reaches its operational position, to lock the first leg in its operational position to the seat lower portion, while releasing the second leg from its being locked to the first leg, thereby allowing the rotation of the second leg relative to the first leg between the intermediate and operational positions of the second leg, and to lock the second leg in its operational position to the seat lower portion or to the first leg.

The seat further comprises an actuating arrangement 302 associated with the second locking mechanism 202, configured to apply to the second leg a pushing or pulling force to cause it to rotate between its operational and intermediate positions when released from being locked to the first leg.

The first locking mechanism 179 can have any suitable construction, allowing it to be operable by the user's operating a corresponding button or handle (not shown), which can be situated at any location of the seat readily accessible by the user, e.g. adjacent the head portion or adjacent the feet portion of the seat. The locking mechanism 179 can, for example, have the same construction as that described in detail US 2012/0032420, whose corresponding figures and description are incorporated herein by reference.

In addition, each locking assembly 138 comprises an arrangement responsible for the rotation of the handle 36 between its different positions and its fixation in each of these positions. This arrangement can be the same as described in detail US 2012/0032420, whose corresponding figures and description are incorporated herein by reference.

For each of the four configurations of combination-seat 28, the locking assembly 138 maintains the seat 30, the legs-and-wheels 32 and 34, and the handle 36 in fixed desired positions relative to one another. As will be appreciated from the description below, the locking assembly 138 allows the handle 36 and the sets of legs-and wheels 32, 34 to rotate generally independently, around a common axis, which in the described embodiment is the axis X.

In a first configuration 40 of combination-seat 28 (a storage mode shown in FIG. 1A), front legs-and-wheels 32, rear legs-and-wheels 34, and handle 36 are held by the locking assembly 138 in positions that fold the legs-and-wheels and handle to be generally non-protrusive from baby seat 30. In the configuration 40 the legs-and-wheels and handle are at the back of, and generally conform with and partially recess into, the baby seat. In the first configuration 40, (and also in the second, third and fourth configurations described below) the handle 36 is locked.

In order to further facilitate the folding of legs-and-wheels to be non-protrusive, the distances between rear wheels 35 of rear legs-and-wheels 34 can be shorter than the distance between front wheels 33 of front legs-and-wheels 32, along a direction parallel to the axis X. In an alternate embodiment of the present invention, the distances between the front wheels are shorter than the distances between the back wheels, to facilitate the non-protrusive aspect. In a still further alternative, the leg supports of the two legs can have different shapes and/or their wheels can be oriented so as to ensure their accommodation under the head portion of the seat in a non-protrusive manner. In addition, while the rear wheels may be joined by an axle, as described below but not shown in FIGS. 1A and 1B, front wheels 33 are typically only connected to their respective legs, so further enhancing the non-protrusive ability of the legs-and-wheels by allowing the overlap of the front wheels and the rear wheels.

In this non-protrusive state, i.e., in the first configuration 40, combination-seat 28 may be conveniently positioned on the seat of passenger-carrying vehicle such as an automobile or truck. Thus, in configuration 40, the combination-seat may be used in a similar manner as prior art baby seats, e.g. a baby may be placed in the combination-seat, and safety straps of the automobile or truck may be positioned around the combination, so as to prevent the combination-seat from moving. In this configuration the combination seat 28 can be assembled to the vehicle as a rear facing baby seat.

Although the combination-seat comprises front legs-and-wheels 32, rear legs-and-wheels 34, and handle 36, these elements are folded, as described above. The folding is such that in configuration 40 the combination-seat may be placed on a flat surface, so that curved lower edges 44 are unobstructed by the handle and the legs-and-wheels so allowing the combination-seat to be rocked on the surface. Typically, as shown in configuration 40 (and in configuration 46 described below), edges of supports 37 are configured to conform to lower edges 44. This ensures that the legs fold when the combination-seat is placed on a flat surface.

Because the legs-and-wheels and handle fold to be at the back of the baby seat, there is no restriction in placing a baby in the seat and positioning the safety straps, so that the combination-seat in configuration 40 acts as a prior art baby seat. Also, there is no restriction on placing the combination-seat on a surface and rocking it on the surface using curved edges 44.

In a second configuration 46 (a normal carrying mode shown in FIG. 1B) of the combination-seat, front legs-and-wheels 32 and rear legs-and-wheels 34 remain positioned as per the first configuration. However, handle 36 has been moved into a vertical position, from its position in the first configuration 40. In the second configuration 46 the handle may be used to conveniently carry the combination-seat, so that in this configuration, the combination-seat acts as a bassinet. Also in configuration 46, lower edges 44 may be placed on a flat surface, and the combination-seat may be rocked on the surface, typically using the handle to perform the rocking.

To transfer between the first configuration 40 and the second configuration 46, a user of the combination-seat 28 unlocks the handle so that the handle is free to move between the two positions. In configuration 46 the handle 36 is located such that its end 61 to be held by the user is disposed on an axis Y (FIG. 1B) passing through the center of gravity of the assembly CG (shown in FIG. 3B of US 2012/0032420) and perpendicular to base plane 29, allowing the user to lift the seat from the ground and keep it parallel to the ground while carrying the seat with the baby therein.

In a third configuration 48 of the combination-seat (a rolling-carrier mode shown in FIG. 2B), front legs-and-wheels 32 and rear legs-and-wheels 34 have been rotated into their operational positions to be below curved edges 44. The handle 36 remains in the same position as per the second configuration 46. For clarity, configuration 50 (non-operational intermediate mode shown in FIG. 3A) and the transitional state 50' (shown in 3B) illustrate the positions of the legs-and-wheels as the combination-seat moves between the second and third configurations. In the third configuration 48 front legs-and-wheels 32 and rear legs-and-wheels 34 are positioned in their operational positions, so that the wheels of the legs-and-wheels may be used to wheel the combination-seat. Thus, in the third configuration, the combination-seat is operative as a bassinet with legs and wheels. Typically, the wheels of one pair of legs-and-wheels are coupled to the respective pair of legs so as to be able to rotate the wheels around an axis that is orthogonal to the symmetry axis of rotation of the wheels. This freedom of rotation of one set of wheels allows the combination-seat to be easily steered in any direction. Thus, in the third configuration, the combination-seat may be operated in a similar manner to a baby carrier.

As far as the legs are concerned, there are two stages required to transfer between the second and third configurations in the described embodiment. During a first stage the front and rear legs of each of the right and left pairs are configured to move together (via a number of transitional states one of which is shown as 50' in FIG. 3B) between their storage position and the position, in which the front leg 32 takes its operational position and the rear leg 34 takes its intermediate position (non-operational intermediate mode 50 shown in FIG. 3A); this first-stage movement is performed in the described example under the influence of gravity. During this movement, the front 32 and rear 34 legs of each pair are locked to each other by the second locking mechanism 202 so that a fixed angle β (FIGS. 3A and 3B), is maintained between these legs. It should be indicated that the movement of the legs as described above may also be facilitated by a suitable actuating mechanism.

When the front leg 32 of each pair of legs has reached its operational position, the locking mechanism 202 releases therefrom the rear leg 34, allowing thereby the rear leg 34 to continue its movement from its intermediate position (FIG. 3A) to its operational position (FIG. 4). When this operational position of the rear leg is reached, i.e. when both front and rear legs of each pair are in their operational position, the combination-seat user operates the first locking mechanism 179.

The first locking mechanism 179 locks the two sets of legs-and-wheels to the lower portion of the seat in either the lowered position of the configurations shown in FIGS. 2A and 2B, or the folded recessed position (storage mode 40 shown in FIG. 1A and normal carrying mode 46 shown in FIG. 1B). When the user releases the first locking mechanism 179 by pressing a corresponding button or pulling a corresponding handle, gravity acts on the legs to allow their movement relative to the base section 42 of the seat.

The second locking mechanism 202 locks to each other the front 32 and rear 34 legs of each of the right and left pairs thus maintaining them in their first relative position of configurations 28 (FIG. 1A) and 26 (FIG. 1B) and in their transitional states (such as 50' in FIG. 3B) allowing them to move together until the front leg 34 reaches its operational position and the rear leg 34 reaches its intermediate position, in configuration 50 (FIG. 3A). Then, the second locking mechanism 202 locks the front leg 32 to the base section 42, and releases the rear leg 34, allowing it to complete the second stage, i.e. to complete its movement to its operational position by means of the actuating mechanism 302, thereby bringing the seat into its third configuration 48 (FIG. 2B). The user then operates the first locking mechanism 179 by releasing the button or the handle, to lock the legs to the lower portion of the seat.

To move from configuration 48 to configuration 46, the user releases the first locking mechanisms 179, again by pressing the button or pulling the handle, and pushes the rear legs-and-wheels while lowering the seat so that, with the help of the seat's own weight, the rear legs rotate from their operational position to their intermediate position (FIG. 3A), in which the second locking mechanism is operated to lock the rear leg of each pair of legs to the front leg of the same pair and to unlock the front leg from the base section 42 of the seat, after which both legs rotate to their storage position, being locked to each other and thus maintaining the angle β therebetween.

To fix the rear legs in place during the above operation, the user can insert the tow part of his/her shoe or boot in the cut-out 375 of the rear wheel 35 that is closest to him/her, and press downwardly on its radially distal surface portion 410, which surface portion is described in detail above.

In the configuration 60 (FIG. 4) of the combination-seat, front legs-and-wheels 32 and rear legs-and-wheels 34 are in the same positions, relative to seat 30, as in third configuration 48. In the configuration 60 handle 36 is initially in a non-extended arrangement, as indicated in configurations 46 and 48. In the intermediate configuration the handle rotates from the third configuration 48, around locking assembly 138, so as to be at an angle α to the base plane 29.

In a fourth configuration 52 (FIG. 2A) handle 36 extends along its own length to form a lengthened handle to increase the distance from its distal end 61 to the base plane 29, in an extended arrangement shown in FIG. 2A, the handle being designed to telescope within itself. The extension of the handle may be by any convenient length. A user of the combination-seat extends the handle from the intermediate configuration 60 to configuration 52, wherein the handle is locked in its extended state. This can be achieved using spring stoppers in a manner similar to that used in umbrellas, allowing the user of the combination-seat to retract the handle by pushing in on the stoppers, as described in US 2012/0032420, whose corresponding drawings and description are incorporated herein by reference.

The combination-seat is constructed so that only in the fourth configuration may the handle be extended.

Typically, the angle of the handle and the amount of its extension in configuration 52 are selected so that an end of the handle used to push or pull the combination-seat in configuration 52 is at a convenient height for an adult to operate the combination-seat as a baby carriage, when both the adult and the carriage are on a level surface. Thus, in configuration 52, the combination-seat may be operated in a similar manner to a baby carriage.

The arrangement of the legs-and-wheels assemblies can be such that the rear wheels 35 and front wheels 33 are separated along the direction parallel to the axis X, when seen in the front view of the seat both, when in their storage positions and when in the operational positions, similarly to their mutual disposition described in US 2012/0032420, whose corresponding drawings and description are incorporated herein by reference.

The reference is now made to FIGS. 5A to 9D, showing the support portions 31 and 37 of the respective front and rear leg-and-wheels assemblies 32 and 34, of one pair of such assemblies, together with a cover element 130 mounted to the base section 42 of the seat, the second locking mechanism 202 and the actuating mechanism 302, and these mechanisms and their operation will now be described in detail. It should, however, be explained in this connection, that the above figures do not show, and the description below does not include, the manner in which the support legs 31 and 37 are held at the base section 42 of the seat along the axis X. This manner can be any suitable one, including the one disclosed in US 2012/0032420, whose corresponding figures and description are incorporated herein by reference.

With reference to FIGS. 5A to 5C, the front support 31 comprises a proximal disc-like section 90, and the rear support 37 comprises a proximal disc-like section 110, which sections are mounted by means on their central openings (not designated) in the same manner as those of the seat of US 2012/0032420, whose corresponding description and drawings are incorporated herein by reference. The sections 90 and 110, together with a cover element 130 (FIGS. 5A and 5C), accommodate the second locking mechanism 202 and the actuating mechanism 302.

The section 90 has an inner face 91 (FIG. 5A) and an outer face 93 (FIG. 5B). The inner face 91 is formed with a first arched recess 95, a second arched recess 97 and a through opening 99 extending between the inner face 91 and the outer face 93.

The section 110 has an inner face 111 (FIGS. 5B and 5C) and an outer face 113 (FIG. 5A). The inner face 111 is formed with an inwardly protruding pin 115, two small recesses 112 and 114 and one long recess 116 (all best seen in FIG. 5C). The outer face 113 of the section 110 comprises cam-like protuberances 117 (FIG. 5A).

The pin 115 together with the first arched recess 95, and the cam-like protuberances 117 act similarly to the corresponding elements of US 2012/0032420, whose description therein is incorporated herein by reference.

The second locking mechanism 202 is formed by a pin 102, the opening 99 of the section 90, and the long recess 116 of the section 110, along which the pin 102 is configured to slide, and a recess 131 in an inner surface 130' of the cover element 130.

Figure 6B:
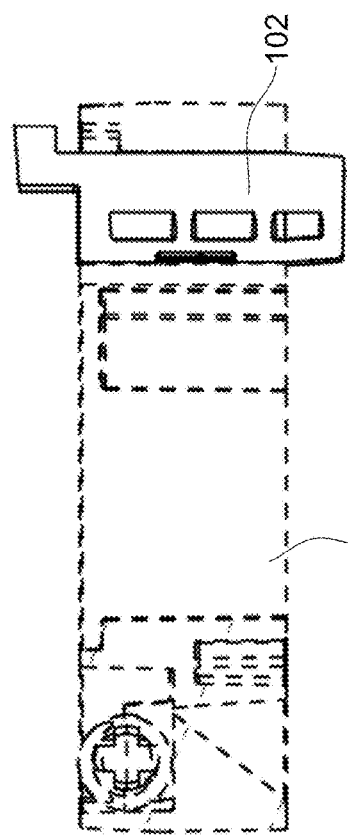
FIG. 6B is a cross-sectional view of a disk-like portion of the front leg, taken along line A'-A' in FIG. 6A, when the safety car seat is in a position shown in FIG. 6A'.
Figure 6A:
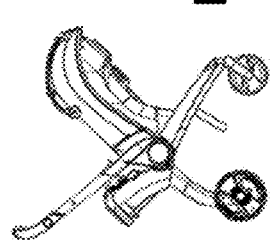
FIG. 6A is a cross-sectional view of the front leg, when the safety car seat is in a position shown in FIG. 6A'.
Figure 6A:
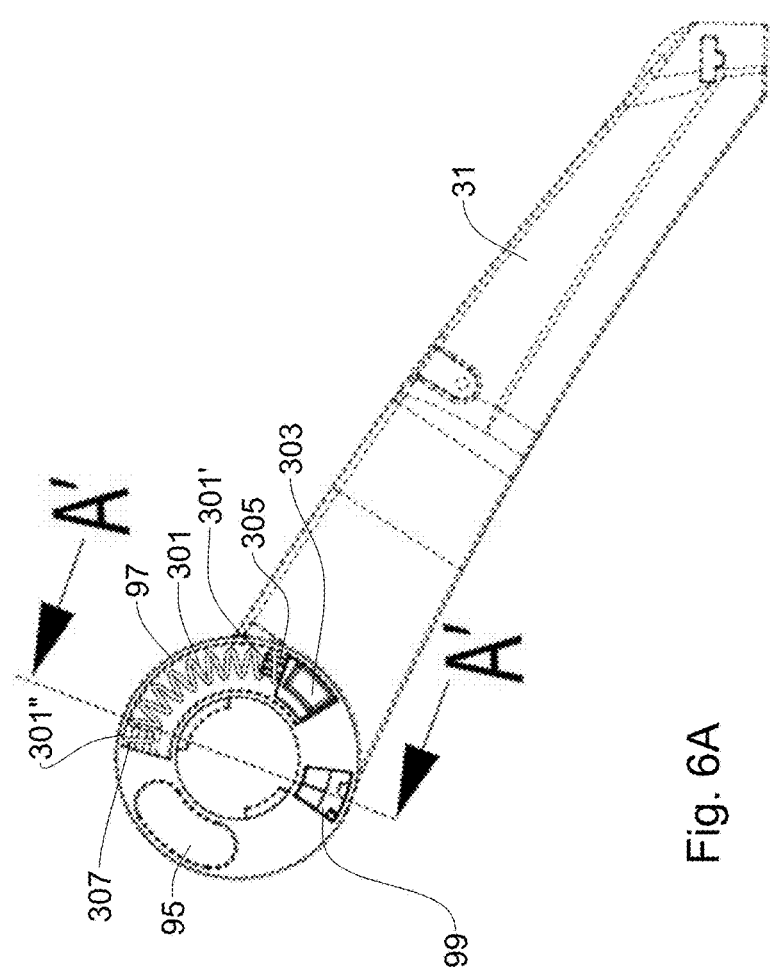
Figure 6C:
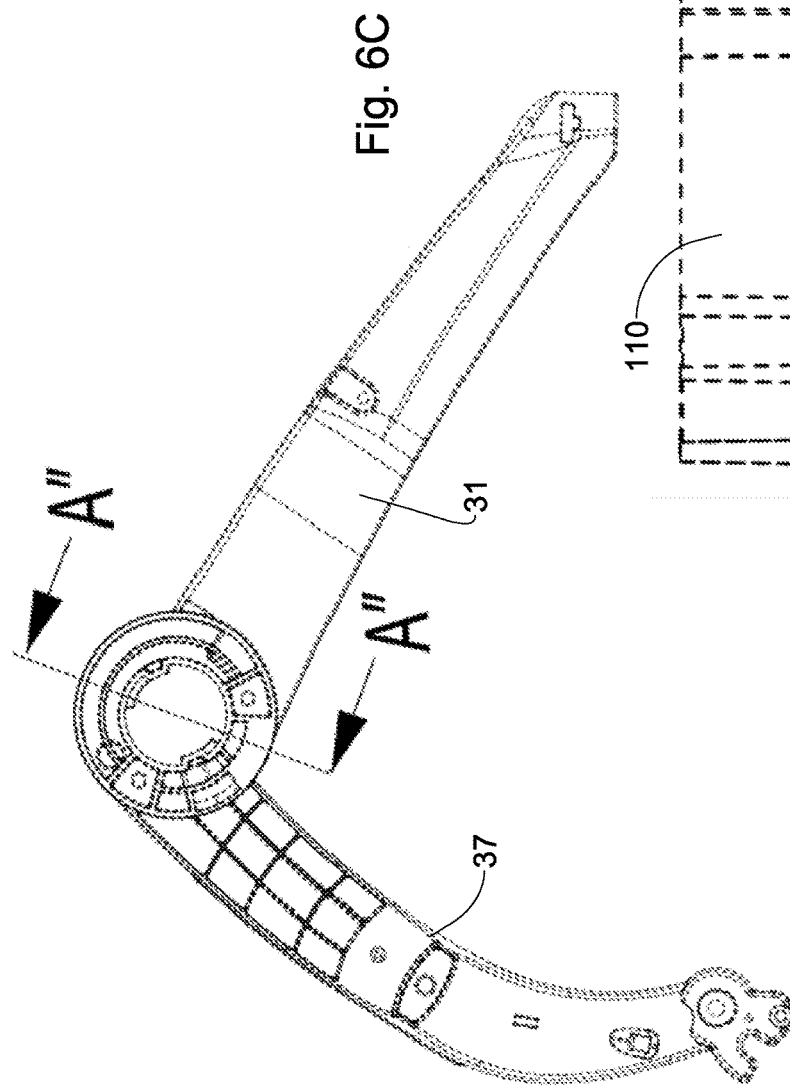
FIG. 6C is a cross-sectional view of the front and rear legs, when the safety car seat is in a position shown in FIG. 6A'.
Figure 6D:
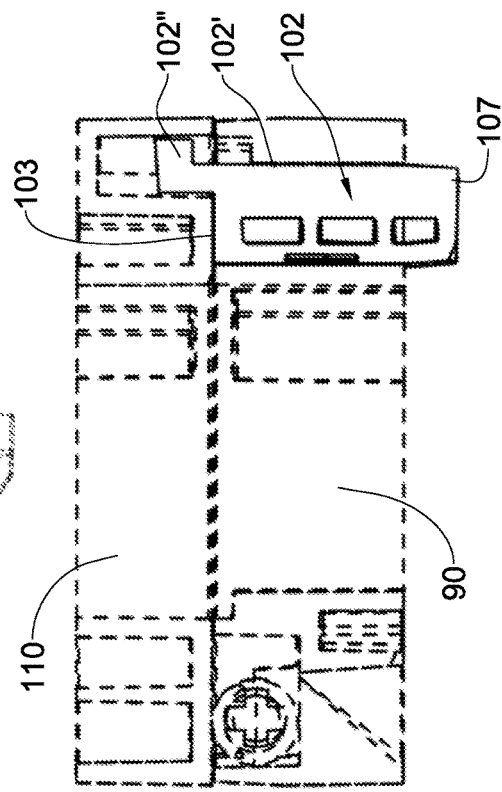
FIG. 6D is a cross-sectional view of the disk-like portions of the front and rear legs, taken along line A"-A" in FIG. 6C, when the safety car seat is in a position shown in FIG. 6A'.
Figure 7C:
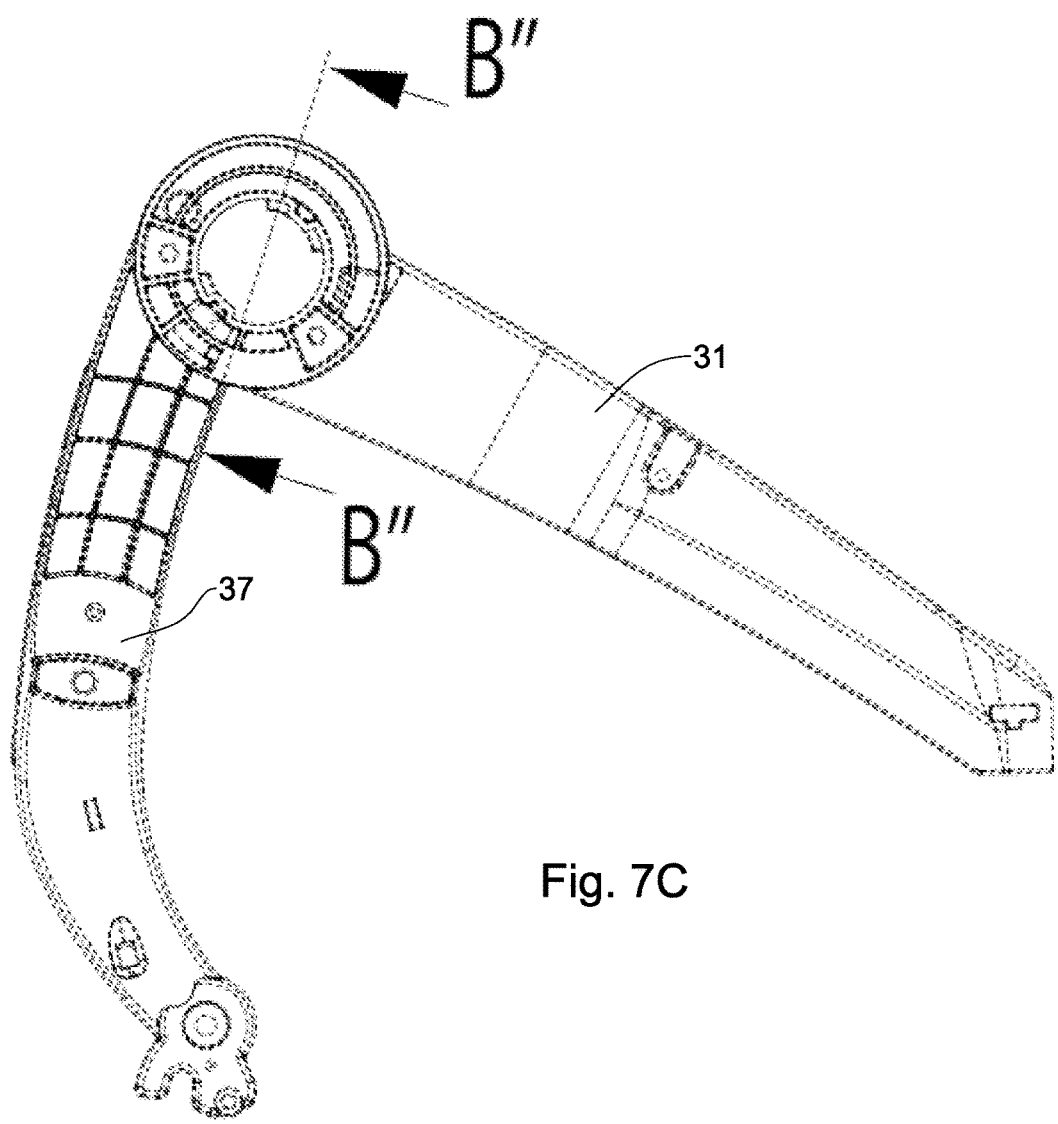
FIG. 7C is a cross-sectional view of the front and rear legs, when the safety car seat is in a position shown in FIG. 7A'.
Figure 7D:
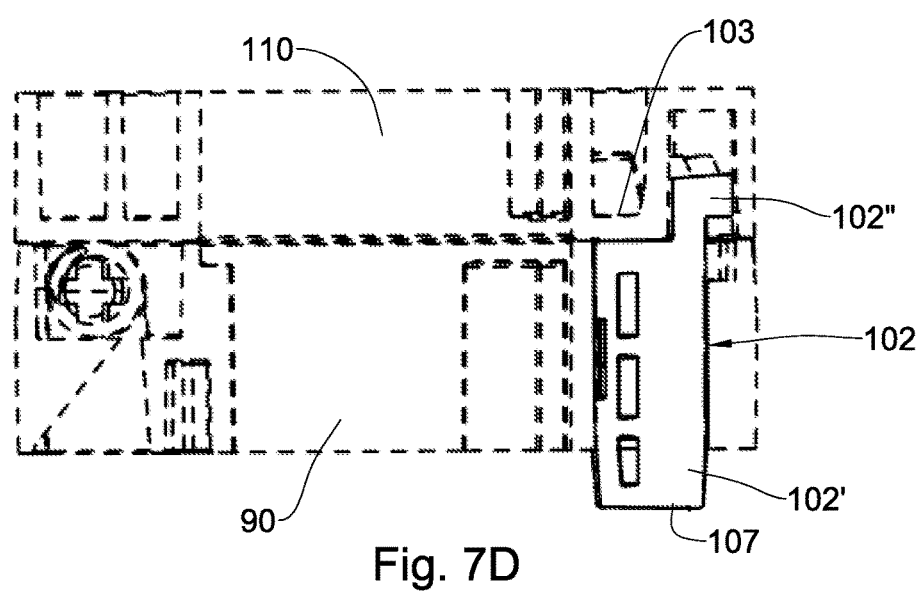
FIG. 7D is a cross-sectional view of the disk-like portions of the front and rear legs, taken along line B"-B" in FIG. 7C, when the safety car seat is in a position shown in FIG. 7A'.

With reference also to FIGS. 5A to 5C, and 6A to 9D, the pin 102 has a wide body section 102' passing through the opening 99 so that a part thereof having a narrow pin body section 102" protruding from an end 103 of the wide body section (FIGS. 5A and 5C), projects from the opening 99 towards the support leg 37 and another part thereof with its end 107 protrudes towards the cover element 130. The recess 116 comprises a sloped locking portion 116' (FIG. 5C) configured to receive therein the end 103 of the wide body section 102' of the pin, with its narrow body section 102", and a releasing portion 116" configured to freely receive therein only the narrow section 102" of the pin with a possibility of its sliding along the releasing portion 116" (FIG. 5C), between its first end 116a disposed adjacent the locking portion 116' and its second end 116b (FIG. 5C) remote from the locking portion 116', thereby allowing the pin 102 to take a number of states as follows:

- a first, pin's locking state, in which the end 103 of the pin with its narrow section 102" is received within the locking portion 116' of the recess 116, and the end 107 of the pin abuts the inner surface 130' of the cover element 130 at its area other than the recess 131, thereby locking the two leg supports 31 and 37 to each other; this state is illustrated in FIGS. 8B, 8D, and 9B, 9D, and it is associated with the respective storage positions of the legs (FIGS. 8A', 9A') in respective seat configurations 40 and 46 (FIGS. 1A and 1B) and with the transitional states such as the state 50' (FIG. 3B);
- a second, pin's movement state, in which the narrow section 102" of the pin is slidingly received within the releasing portion 116" of the recess 116, enabling its movement between the two ends 116a and 116b of the releasing portion 116", and the end 107 of the pin is received within the recess 131 of the cover element 130, releasing the leg support 37 of being locked to the leg support 31; this state is illustrated in FIGS. 7B and 7D and it is associated with the movement of the leg support 37 relative the leg support 31 (FIG. 7A') between the intermediate position (FIG. 3A) of the rear leg 34 in the configuration 50 (FIG. 3A) and its operational position in the seat configurations 52 and 48 (FIGS. 2A and 2B);
- a third, pin's abutment state, in which the narrow body section 102" of the pin abuts the end 116b of the recess 116, with the end 107 of the pin still abutting the inner surface 130' of the cover element; this state is illustrated in FIGS. 6B and 6D, and it is associated with the operational position of the rear leg 34 (FIG. 6A') in the seat configurations 52 and 48 (FIGS. 2A and 2B).

Figure 8A:
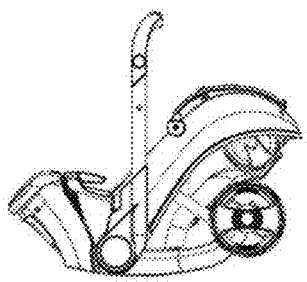
FIG. 8A is a cross-sectional view of the front leg, when the safety car seat is in a position shown in FIG. 8A'.
Figure 8A:
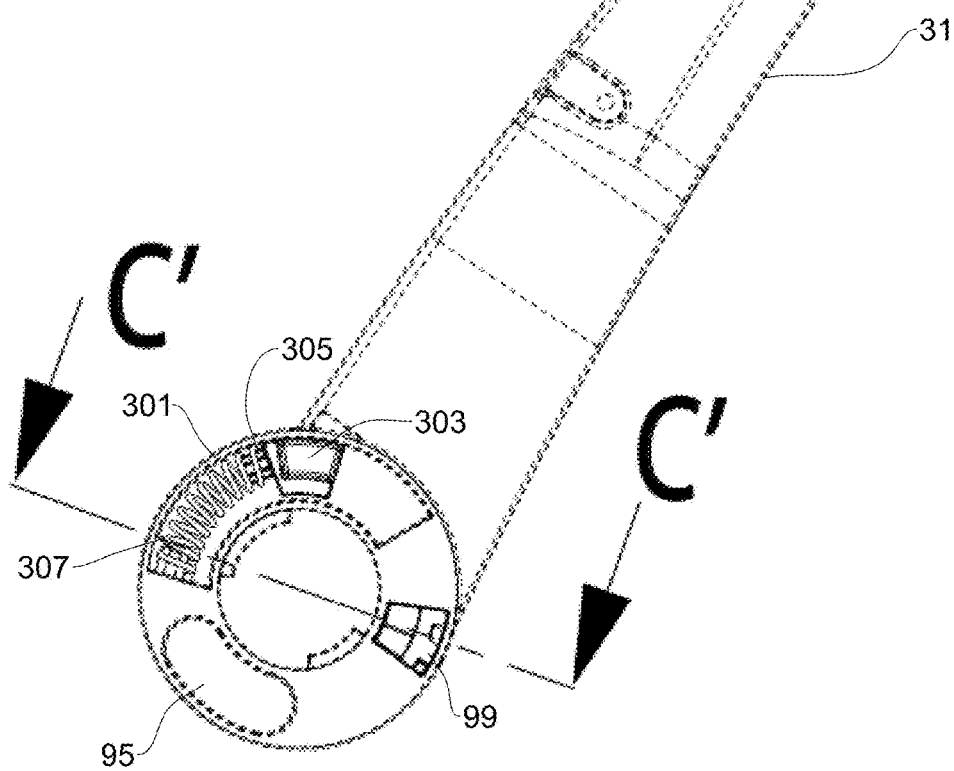
Figure 8B:
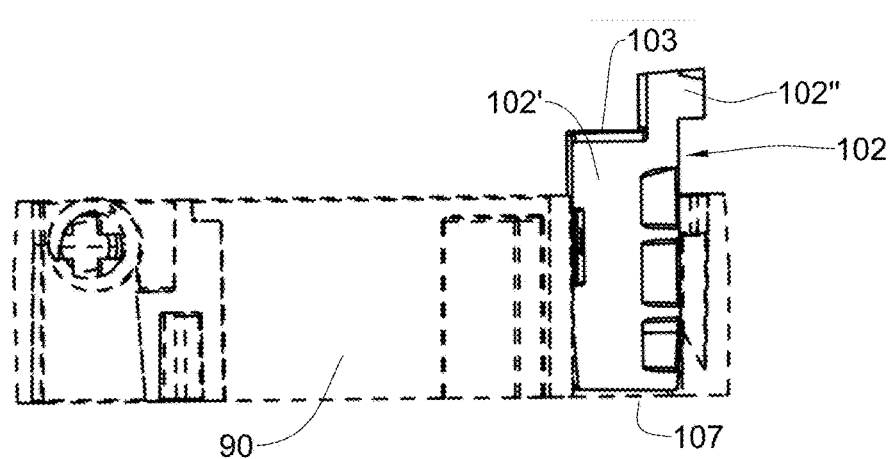
FIG. 8B is a cross-sectional view of a disk-like portion of the front leg, taken along line C'-C' in FIG. 8A, when the safety car seat is in a position shown in FIG. 8A'.
Figure 8C:
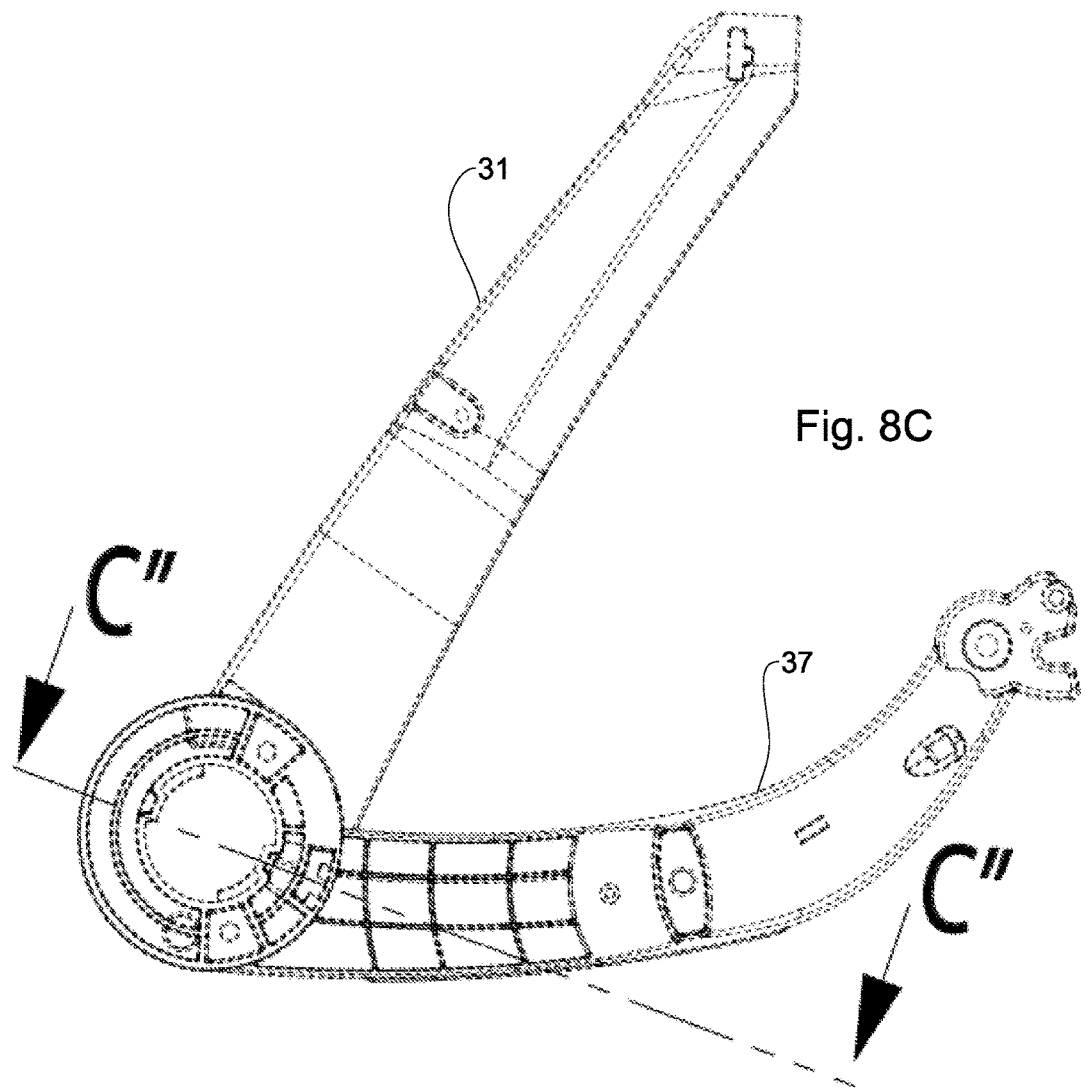
FIG. 8C is a cross-sectional view of the front and rear legs, when the safety car seat is in a position shown in FIG. 8A'.
Figure 8D:
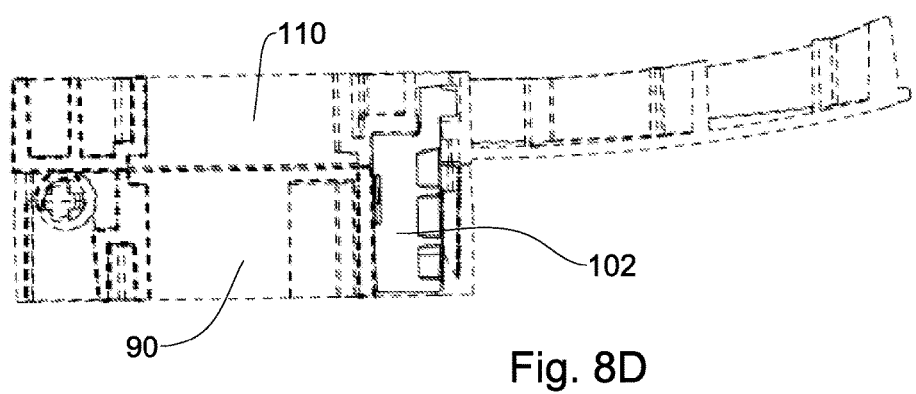
FIG. 8D is a cross-sectional view of the disk-like portions of the front and rear legs, taken along line C"-C" in FIG. 8C, when the safety car seat is in a position shown in FIG. 8A'.

In other words, as shown in FIG. 8D, when the end 103 of the pin wide body section 102' together with the pin narrow body section 102" is received within the sloped locking portion 116' of the recess 116, the sections 90 and 110 of the supports 31 and 37, respectively, are locked to each other and maintained at a fixed angle with respect to each other. As the seat 28 changes its configuration from configuration 46 through the transition state 50' (FIG. 3B) to intermediate configuration 50 (FIG. 3A), the pin 102 slides along the sloped locking portion 116', while keeping the sections 90 and 110 attached to each other. When the seat reaches configuration 50, the pin 102 is released from the sloped locking portion 116', releasing thereby the section 110 of rear support 37 from the section 90 of the front support 31, and continues to slide along the releasing portion 116", so as to reach the third pin state, shown in FIGS. 6A to 6D, corresponding to the end position of the rear support 37, in configuration 48 of the seat 28. When the pin 102 is released from the sloped locking portion 116' and its narrow body portion 102" moves along the releasing portion 116" of the recess 116, its end 107 abutting the inner surface 130' of the cover section 130 (shown only in FIGS. 5A and 5C), moves along this surface until its entry into the recess 131 therein. At this stage, the front support 31 is released from being locked to the rear support 37, and the pin 102 locks the section 90 of the front support 31 to the base section 42 of the seat 28.

The actuating mechanism 302 is formed by a spring 301, a spring loaded pin 303, with a spring seat 305 to which a first end 301' of the spring 301 is attached, the arched recess 97 of the section 90 (FIG. 5A), which accommodates the pin 303 and the spring 301, and the corresponding recess 112 (FIG. 5C) of the section 110, which receives a mounting portion 304 of the pin 303. The arched recess 97 is formed with a spring seat 307 (FIG. 5A) to which a second end 301" of the spring 301 is attached.

In configuration 48 of the seat 28 the spring 301 is in its normal state and entirely occupies the entire arched recess 97, as shown in FIG. 9A, while in configuration 46 of the seat 28 the spring 301 is maximally loaded, due to the pressure applied thereto by the pin 303, which slides towards the spring seat 307, as shown in FIG. 9A.

As the seat 28 changes its configuration from configuration 48 to configuration 50, the support 37 rotates with respect to the support 31, which is locked to the seat base section 42, and the spring 301 is pressed against the pin 301, which slides along the second arched recess 97. When the seat 28 reaches its configuration 50, the pin 102 is forced to move from the releasing portion 116" to the sloped locking portion 116', locking thereby the supports 31 and 37 to each other, and releasing the front support 31 from being locked to the seat base section 42. The supports 31 and 37 then move together, at a fixed angle β, to configuration 46 of the seat 28, as the pin 102 moves along the sloped locking portion 116', and stay locked to each other also when the seat takes the configuration 40.

It will be appreciated that the embodiments described above are cited by way of example, and various features thereof and combinations of these features can be varied and modified. For example, the front and rear legs can be rotatable in different directions and have their storage positions on different sides of their common horizontal axis; the legs can be detachably attachable to the lower portion of the seat to bring it into a state allowing its conversion into a rollable seat, etc.

The invention claimed is:

1. A baby safety car seat having, at least when in use, a state in which the baby safety car seat is convertible into a rollable baby seat, the baby safety car seat, at least in the state, comprising:
   a lower, support portion including a seat lowermost area configured to contact an external surface to which the seat is to be mounted, and defining an imaginary horizontal base plane, and two, right and left, leg attachment areas on respective right and left sides of the lowermost area;
   an upper, seating portion having a front, head area and a rear, feet area, the head area being spaced from the imaginary horizontal base plane to a distance greater than the feet area;
   a right and a left pair of front and rear legs, the legs of each pair having distal ends associated with wheels and proximal ends articulated to the seat lower portion at the corresponding leg attachment area, each leg being rotatable between a storage position to be taken in a safety car seat mode of the seat, in which the distal end of the leg is disposed above the imaginary horizontal base plane, and an operational position to be taken in a rolling-carrier mode of the seat, in which the distal end of the leg is disposed below the imaginary horizontal base plane; the baby safety car seat further having an intermediate mode, in which a first one of the legs of each pair is in the operational position whilst the second leg of that pair is in the intermediate position, in which the distal end of that leg is disposed below said imaginary horizontal base plane but which is other than the operational position of this leg; and a locking arrangement configured for locking the first leg in the operational position to the support portion prior to the movement of said second leg between the intermediate and operational positions.

2. The baby safety seat according to claim 1, wherein the locking arrangement is further configured for locking the legs of each pair to each other during movement thereof between the storage position and the operational position of said first leg combined with the intermediate position of the second leg.

3. The baby safety seat according to claim 1, wherein the second leg of each pair of legs is rotatable from the intermediate position to the operational position by an actuating mechanism operable only when the first leg of said pair is in the operational position.

4. The baby safety car seat according to claim 1, wherein the distal end of at least one leg of each pair is associated with a wheel including a wheel body formed with at least one cut-out, the cut-out having a front edge and a cut-out surface extending rearwardly therefrom having at least one of the following features:

the cut-out surface having a radially distal surface portion oriented so that a radially distal portion of the front edge of the cut-out is disposed further from a central axis of the wheel, about which the wheel is to be rotated, than any other area of the radially distal surface portion seen from a front view of the wheel; or in the front plan view of the wheel, the front edge of the cut-out has a length l of at least 4 cm, along which its height H is not less than 3 mm.

5. The baby safety car seat according to claim 1, wherein the distal end of at least one leg of each pair is associated with a wheel including a wheel body with a tire mounted thereon, the wheel body being formed with a surface accessible to a user for applying thereto by his foot of a downward force, said surface having at least one of the following features:

said surface has a non-slip property better than that of at least one other portion of the wheel body, which is optionally achieved by a non-slip texture of said surface;

said surface has a first color different from a second color, which the wheel body has at least at an area of the wheel body surrounding or adjacent the cut-out, wherein said first color optionally contrasts with said second color so that the cut-out is readily distinguishable on the background of the remainder of the wheel of the seat; or said surface is made of a first material other than a second material, from which at least one other portion of the wheel body is made.

6. A baby safety car seat having, at least when in use, a state in which the baby safety car seat is convertible into a rollable baby seat, the baby safety car seat, at least in the state, comprising:

a lower, support portion including a seat lowermost area configured to contact an external surface to which the seat is to be mounted, and defining an imaginary horizontal base plane, and two leg attachment areas on two sides of the lowermost area;

an upper, seating portion having a front, head area and a rear, feet area, the head area being spaced from the imaginary horizontal base plane to a distance greater than the feet area;

a right pair of front and rear legs and a left pair of front and rear legs, the legs of each pair having distal ends associated with wheels and proximal ends articulated to the seat lower portion at the corresponding right or left leg attachment area, each legs being rotatable between a storage position to be taken in a safety car seat mode of the seat, in which the distal end of the leg is disposed above the imaginary horizontal base plane, and an operational position to be taken in a rolling-carrier mode of the seat, in which the distal end of each leg is disposed below the imaginary horizontal base plane, each pair of legs having a common storage state in which both legs are in the storage position, a common operational state in which both legs are in the operational position, and an intermediate state in which a first of the legs is in the operational position whilst the second leg is movable between the intermediate and operational position; and a locking mechanism configured for locking the front and rear legs of each pair to each other during movement thereof between the storage and intermediate state and locking said first leg in the operational position prior to unlocking the legs from each other to allow the movement of said second leg between the intermediate and operational positions.

7. The baby safety car seat according to claim 6, wherein the distal end of at least one leg is associated with a wheel including a wheel body formed with at least one cut-out, the cut-out having a front edge and a cut-out surface extending rearwardly therefrom having at least one of the following features:

the cut-out surface having a radially distal surface portion oriented so that a radially distal portion of the front edge of the cut-out is disposed further from a central axis of the wheel, about which the wheel is to be rotated, than any other area of the radially distal surface portion seen from a front view of the wheel; or in the front plan view of the wheel, the front edge of the cut-out has a length l of at least 4 cm, along which its height H is not less than 3 mm.

8. The baby safety car seat according to claim 6, wherein the distal end of at least one leg is associated with a wheel including a wheel body with a tire mounted thereon, the wheel body being formed with a surface accessible to a user for applying thereto by his foot of a downward force, said surface having at least one of the following features:

said surface has a non-slip property better than that of at least one other portion of the wheel body, which is optionally achieved by a non-slip texture of said surface;

said surface has a first color different from a second color, which the wheel body has at least at an area of the wheel body surrounding or adjacent the cut-out, wherein said first color optionally contrasts with said second color so that the cut-out is readily distinguishable on the background of the remainder of the wheel of the seat; or said surface is made of a first material other than a second material, from which at least one other portion of the wheel body is made.

\* \* \* \* \*